US011463041B2

(12) United States Patent
Ishida et al.

(10) Patent No.: US 11,463,041 B2
(45) Date of Patent: Oct. 4, 2022

(54) BUILDING MATERIAL-INTEGRATED SOLAR CELL MODULE AND ROOF STRUCTURE PROVIDED WITH SAME

(71) Applicant: KANEKA CORPORATION, Osaka (JP)

(72) Inventors: Kensuke Ishida, Osaka (JP); Hideki Ooe, Osaka (JP); Takehiko Yoshioka, Osaka (JP); Yuki Fuji, Osaka (JP); Yasumasa Sano, Osaka (JP); Masashi Kirimura, Osaka (JP); Hiroyuki Yamaguchi, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 17/196,726

(22) Filed: Mar. 9, 2021

(65) Prior Publication Data

US 2021/0194413 A1 Jun. 24, 2021

Related U.S. Application Data

(63) Continuation of application No. PCT/JP2019/032625, filed on Aug. 21, 2019.

(30) Foreign Application Priority Data

Sep. 10, 2018 (JP) .............................. JP2018-168590
Apr. 9, 2019 (JP) .............................. JP2019-073954

(51) Int. Cl.
*H02S 20/26* (2014.01)
*H02S 20/25* (2014.01)
(Continued)

(52) U.S. Cl.
CPC ................ *H02S 20/25* (2014.12); *E04D 1/30* (2013.01); *H02S 40/36* (2014.12); *E04D 2001/308* (2013.01)

(58) Field of Classification Search
CPC ............ H02S 20/25; H02S 40/36; E04D 1/30
See application file for complete search history.

(56) References Cited

U.S. PATENT DOCUMENTS 6,242,685 B1 * 6/2001 Mizukami ............... F24S 80/70
136/244
6,294,724 B1 * 9/2001 Sasaoka ................ H01L 31/048
136/251

(Continued)

FOREIGN PATENT DOCUMENTS

| JP | 2002-115372 A | 4/2002 |
| JP | 2005-518486 A | 6/2005 |
| JP | 4759904 B2 | 8/2011 |

OTHER PUBLICATIONS

International Search Report issued in PCT/JP2019/032625; dated Oct. 21, 2019.

*Primary Examiner* — Babajide A Demuren
(74) *Attorney, Agent, or Firm* — Studebaker & Brackett PC

(57) ABSTRACT

A building material-integrated solar cell module (5) includes a solar cell panel (11), a cushioning member (13) disposed at a back side of the solar cell panel (11), a base plate (9) formed of an incombustible material and supporting the cushioning member (13), and a cable (35) drawn from the back side of the solar cell panel (11) and wired on a front side of the base plate (9).

15 Claims, 24 Drawing Sheets

(51) Int. Cl.
*H02S 40/36* (2014.01)
*E04D 1/30* (2006.01)

(56) References Cited

U.S. PATENT DOCUMENTS

| | | | |
|---|---|---|---|
| 6,360,497 B1* | 3/2002 | Nakazima | H02S 20/25 52/173.3 |
| 6,365,824 B1* | 4/2002 | Nakazima | H01L 31/048 136/251 |
| 6,420,645 B1* | 7/2002 | Ohtsuka | H01L 31/048 136/251 |
| 2001/0034982 A1* | 11/2001 | Nagao | H02S 20/23 52/173.3 |
| 2002/0129849 A1* | 9/2002 | Heckeroth | E04D 5/00 136/251 |
| 2003/0034064 A1 | 2/2003 | Hatsukaiwa et al. | |
| 2003/0154666 A1* | 8/2003 | Dinwoodie | E04D 1/30 52/173.3 |
| 2003/0154667 A1* | 8/2003 | Dinwoodie | H02S 20/23 52/173.3 |
| 2004/0074156 A1* | 4/2004 | Haynes | E04D 13/1478 52/58 |
| 2004/0221886 A1* | 11/2004 | Oono | F24S 25/61 136/251 |
| 2004/0244827 A1 | 12/2004 | Hatsukaiwa et al. | |
| 2005/0076948 A1* | 4/2005 | Komamine | H02S 20/25 136/251 |
| 2005/0191957 A1* | 9/2005 | Demetry | F24F 7/025 454/341 |
| 2005/0239394 A1* | 10/2005 | O'Hagin | E04D 1/30 454/366 |
| 2005/0279400 A1* | 12/2005 | Banister | H02S 20/25 136/244 |
| 2006/0032527 A1* | 2/2006 | Stevens | H01L 31/048 136/251 |
| 2007/0227583 A1* | 10/2007 | Davies | F24S 20/69 136/251 |
| 2008/0000512 A1* | 1/2008 | Flaherty | H02S 20/23 136/244 |
| 2008/0149163 A1* | 6/2008 | Gangemi | H02S 40/34 136/246 |
| 2008/0271774 A1* | 11/2008 | Kalkanoglu | H02S 20/23 136/244 |
| 2008/0289272 A1* | 11/2008 | Flaherty | 52/173.3 |
| 2008/0302030 A1* | 12/2008 | Stancel | H02S 20/25 52/173.3 |
| 2010/0132775 A1* | 6/2010 | Le | H01L 31/048 136/255 |
| 2012/0210660 A1 | 8/2012 | Livsey et al. | |
| 2014/0157694 A1 | 6/2014 | Jenkins | |
| 2014/0259973 A1 | 9/2014 | Duarte et al. | |

* cited by examiner

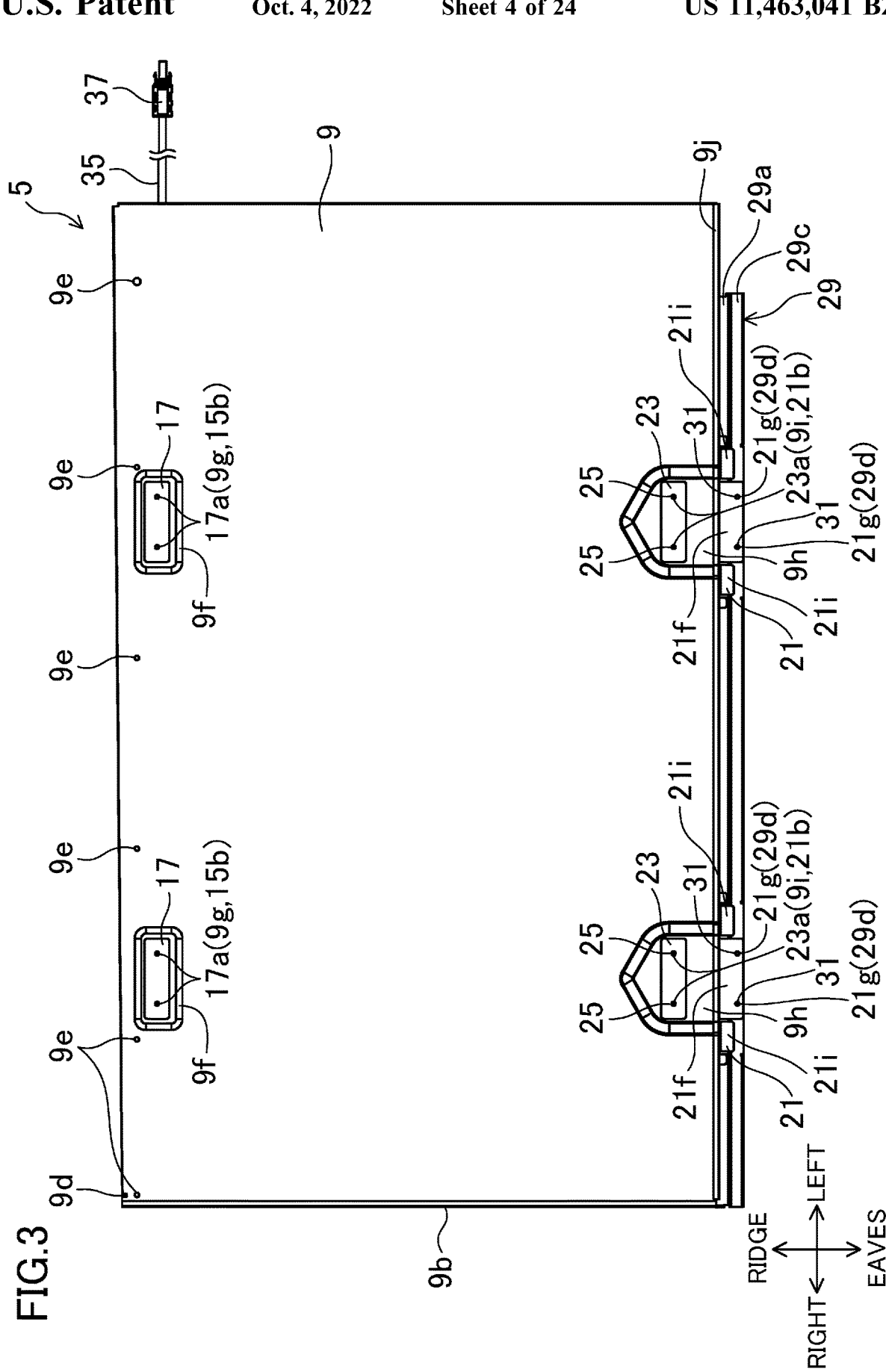

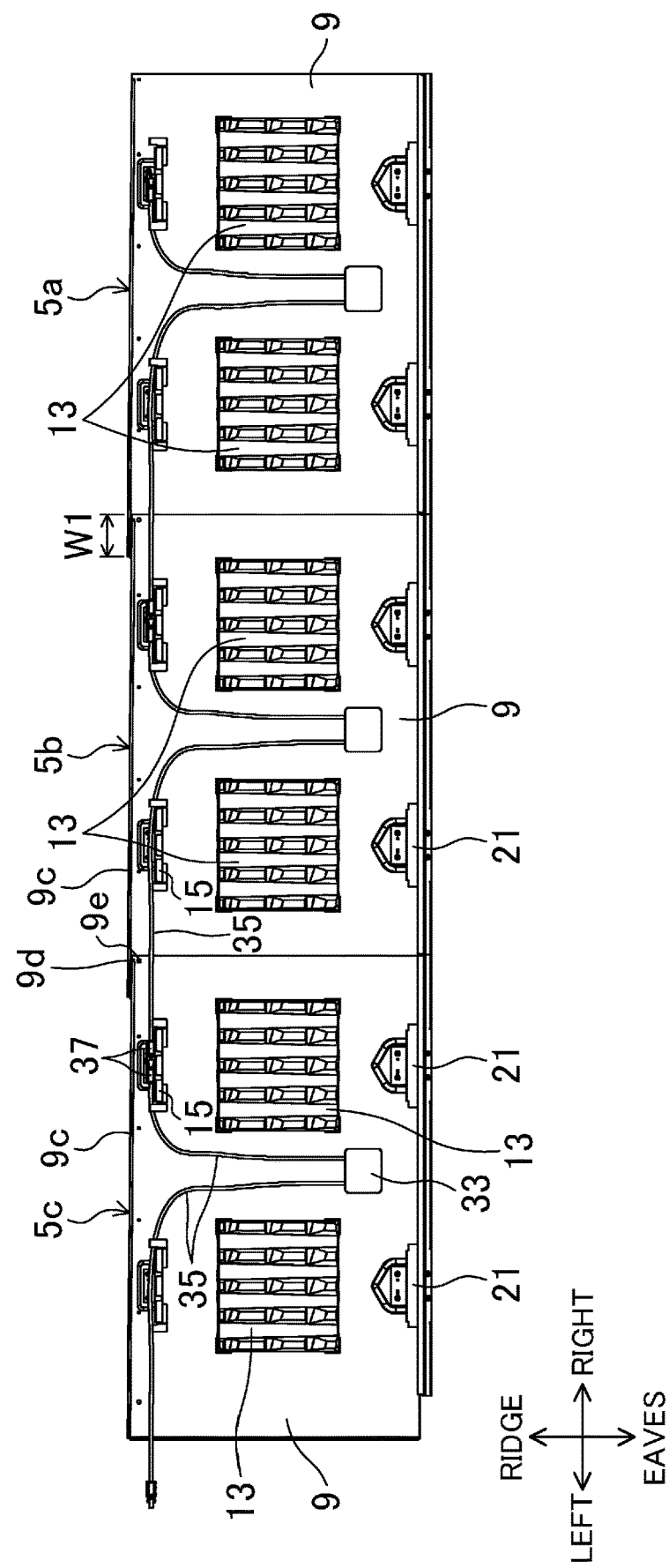

BUILDING MATERIAL-INTEGRATED SOLAR CELL MODULE AND ROOF STRUCTURE PROVIDED WITH SAME

CROSS-REFERENCE TO RELATED APPLICATION

This is a continuation of PCT International Application PCT/JP2019/032625 filed on Aug. 21, 2019, which claims priority to Japanese Patent Applications No. 2018-168590 filed on Sep. 10, 2018 and No. 2019-073954 filed on Apr. 9, 2019. The disclosures of these applications including the specifications, the drawings, and the claims are hereby incorporated by reference in their entirety.

TECHNICAL FIELD

The present invention relates to a building material-integrated solar cell module and a roof structure constructed by arranging solar cell modules.

BACKGROUND ART

Patent Document 1 describes a solar cell module in which an adiabatic support member (corresponding to a cushioning member) is provided on the back sides of solar cells and in contact with the surface of a roof body, and a roof equipped with a power generating function in which such solar cell modules are arranged on the roof body. In Patent Document 1, the adiabatic support member fixed to the back sides of the solar cells are configured to be in contact with the surface of the roof body, and an output cable after construction is kept so as to be floated from a substrate sheet in a cable-holding groove provided in the adiabatic support member.

CITATION LIST

Patent Documents

PATENT DOCUMENT 1: Japanese Patent No. 4759904

SUMMARY OF THE INVENTION

Technical Problem

With recent increase in output capacity of solar cell modules, current flowing in cables and an output voltage tend to increase. In view of this, a building material-integrated solar cell module having enhanced safety in, for example, fire protection performance has been demanded.

The present invention has been made in view of the foregoing circumstances, and has an object of enhancing fire protection performance in a building material-integrated solar cell module.

Solution to the Problem

The present invention provides a building material-integrated solar cell module configured to be attached onto a roof substrate, and includes: a solar cell panel included in the building material-integrated solar cell module; a cushioning member disposed at a back side of the solar cell panel; a base plate formed of an incombustible material, the base plate supporting the cushioning member; and a cable drawn from the back side of the solar cell panel and wired on a front side of the base plate.

Advantages of the Invention

According to the present invention, the cable is disposed at the front side of the base plate, and thus, can obtain high fire protection performance

BRIEF DESCRIPTION OF THE DRAWINGS

FIG. 3 A view of the building material-integrated solar cell module when seen from the back side of the roof surface.

FIG. 5 A front view three building material-integrated solar cell modules that are adjacent to one another in a beam direction in a state where the solar cell panels are detached.

DESCRIPTION OF EMBODIMENTS

Embodiments of the present invention will be described hereinafter with reference to the drawings.

First Embodiment

Figure 1A:
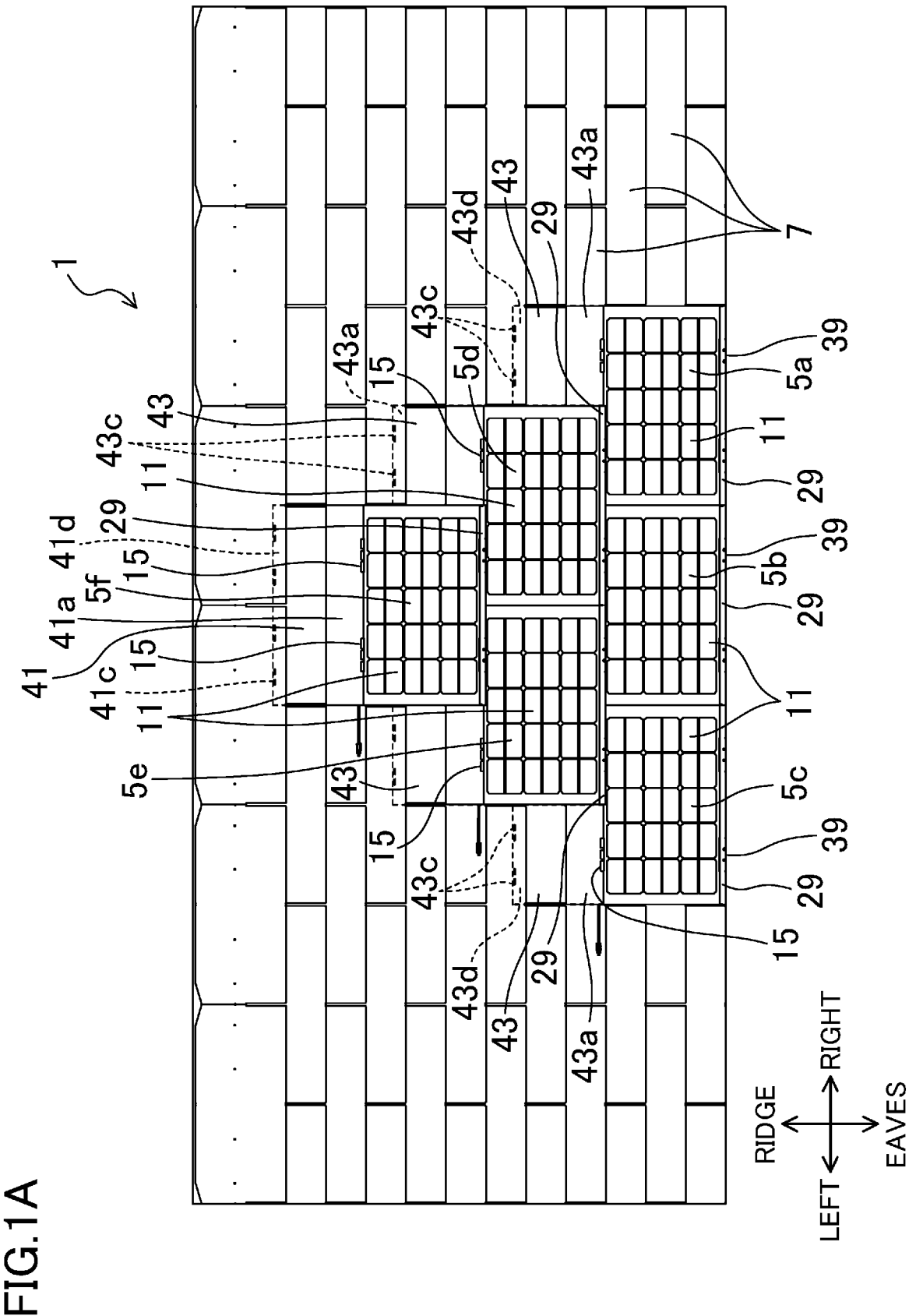
FIG. 1A A plan view illustrating a roof surface to which an installation structure of solar cell panels according to a first embodiment is applied.
Figure 1B:
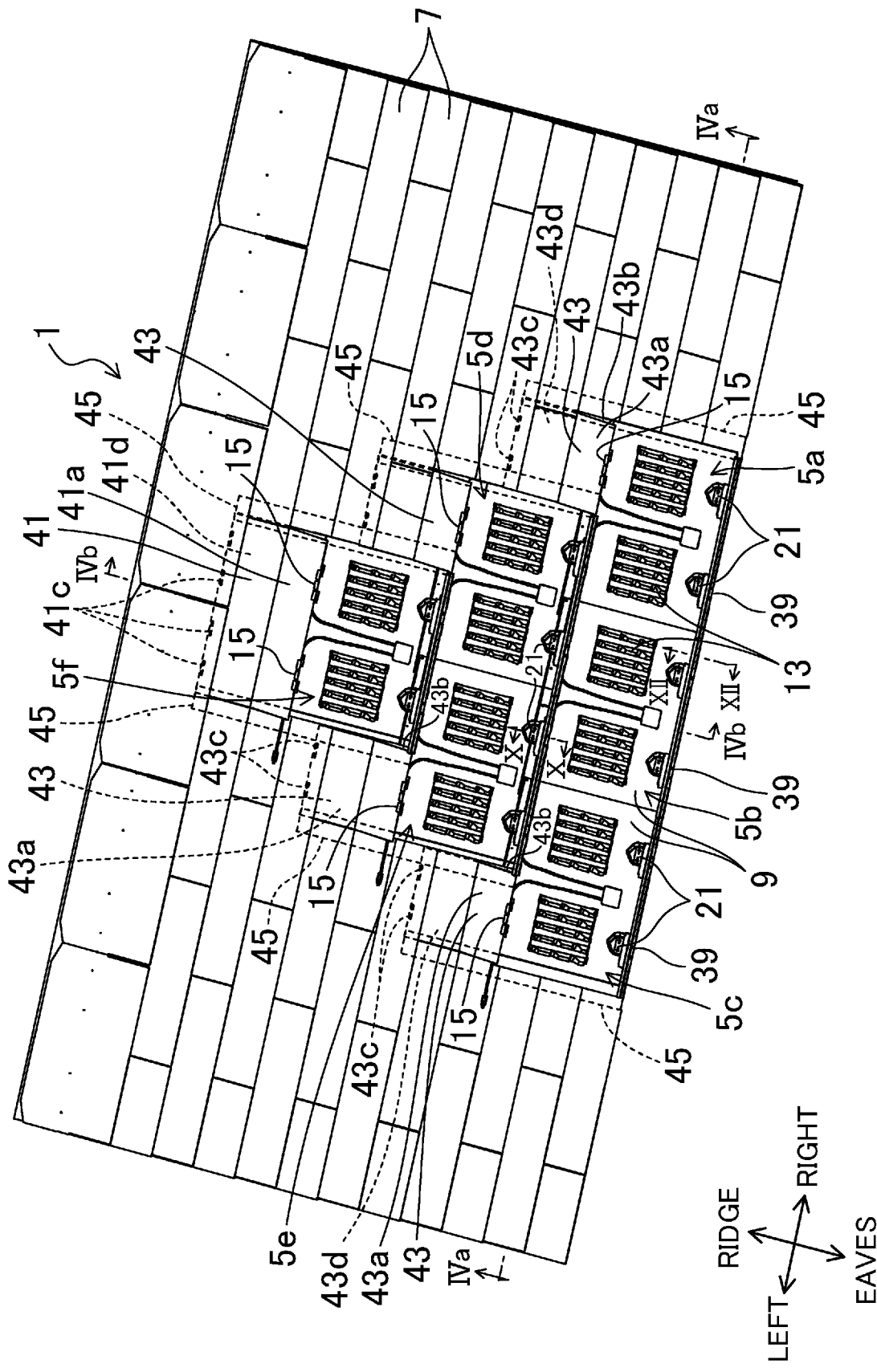
FIG. 1B A perspective view illustrating the roof surface from which the solar cell panels are detached.

FIGS. 1A and 1B illustrate one of a pair of roof surfaces 1 constituting a hip roof. Each of the roof surfaces 1 includes a roof substrate 3 constituted by a sheathing 3a and a waterproof sheet 3b, and a surface of the sheathing 3a is entirely covered with the waterproof sheet 3b (see FIG. 10). A front side when the roof surface 1 is seen from outside, that is, a side facing the sun, will be hereinafter referred to as a front side, and the opposite side will be hereinafter referred to as a back side. A direction orthogonal to an eaves-ridge direction when seen from the front side of the roof surface 1 will be referred to as a beam direction. In the beam direction, the right side when seen from the front side of the roof surface 1 (i.e., the right in FIG. 1A) will be referred to as a right side, and the left side when seen from the front side of the roof surface 1 (i.e., the left in FIG. 1A) will be referred to as a left side.

On a center (partial) region of the surface (the surface of the waterproof sheet 3b) of the roof substrate 3 in the beam direction, six building material-integrated solar cell modules 5a to 5f (hereinafter referred to simply as solar cell modules) are constructed. Specifically, at the eaves-side end of the surface of the roof substrate 3, the solar cell modules 5a to 5c are constructed in this order from the right in a center portion in the beam direction. At the ridge side of the solar cell modules 5a to 5c, the solar cell modules 5d and 5e are constructed in this order from the right, and the solar cell module 5f is constructed at the ridge side of the solar cell modules 5d and 5e. The solar cell modules 5a to 5f have a common structure, and thus, these modules will be denoted by reference numeral 5 when these modules do not need to be distinguished. In regions where the solar cell modules 5a to 5f are not constructed, a plurality of slates 7 (corresponding to a room member) are constructed.

<Configuration of Solar Cell Module>

The "solar cell module" herein refers to a product in which solar cell panels including a plurality of solar cells electrically connected to one another and protected by a sealing material such as a resin are provided with frames and other members.

Figure 2:
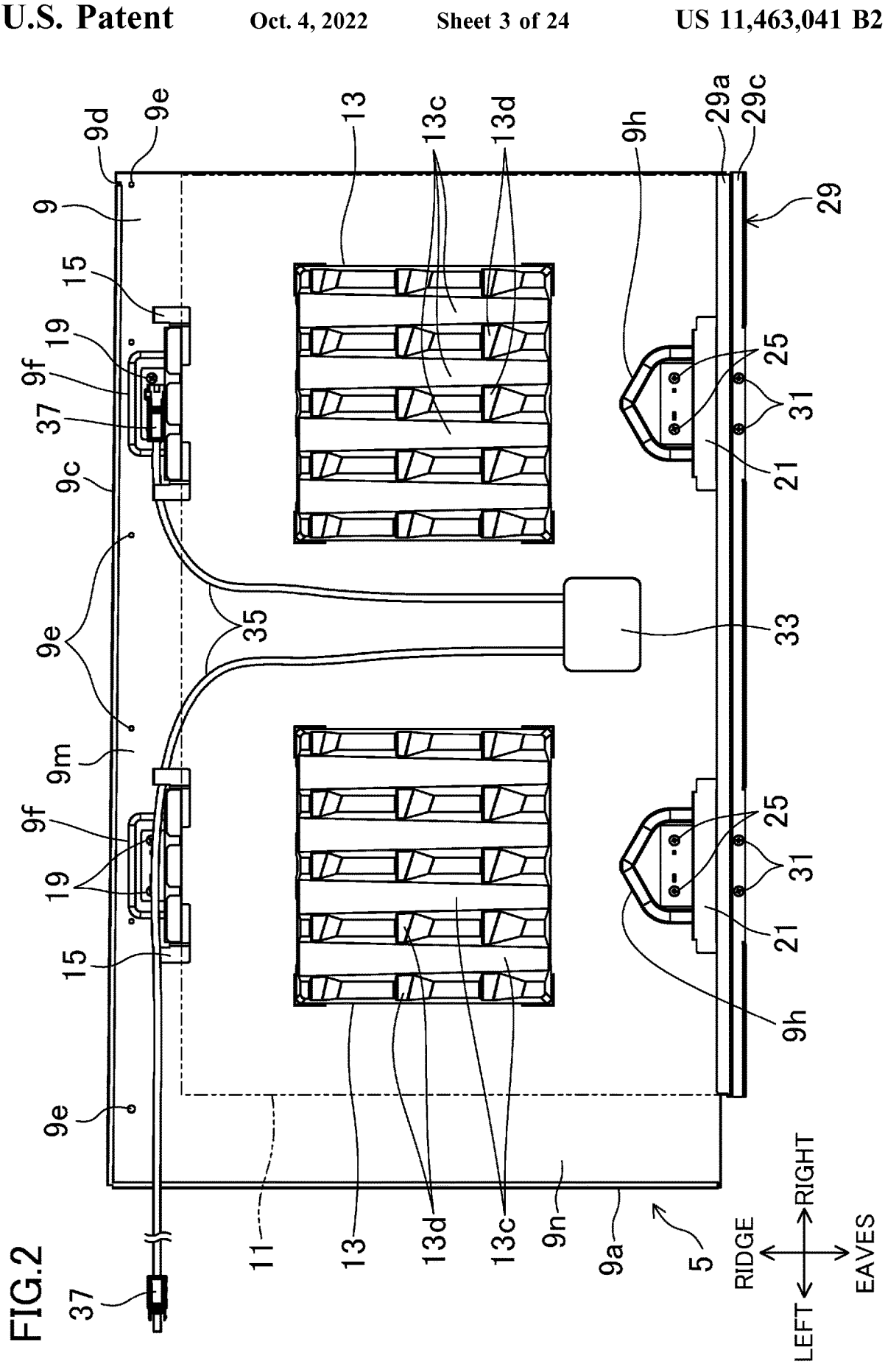
FIG. 2 A view illustrating a building material-integrated solar cell module from which the solar cell panels are detached, when seen from the front side of the roof surface.

As illustrated in FIGS. 2 and 3, each solar cell module 5 includes a base plate 9 having a trapezoidal shape in plan view and formed of a plated steel sheet as an incombustible material, and a solar cell panel 11 to which an installation structure according to an embodiment of the present invention is applied and which is disposed at the front side of the base plate 9. As the incombustible material constituting the base plate 9, a metal except for the plated steel sheet, such as aluminium or stainless, may be employed. In FIG. 2, the solar cell panels 11 are denoted by chain double-dashed lines.

—Base Plate—

As illustrated in FIG. 2, the base plate 9 includes a ridge-side extension portion 9m extended to the ridge side relative to a ridge-side frame member 15 described later, and a beam-side extension portion 9n extended outward relative to at least one end (left end in FIG. 2) of the solar cell panel 11 in the beam direction.

Figure 4A:
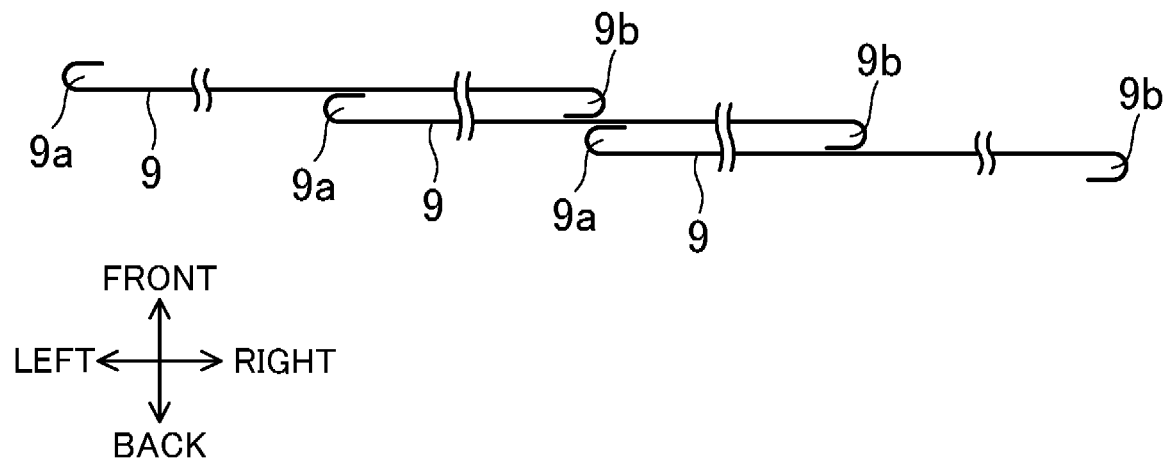
FIG. 4A A cross-sectional view of a base plate taken along line IVa-IVa.

As illustrated in FIG. 4A, a left bent portion 9a that is bent toward the front side to form a U shape in cross section is formed at one end (left end) of the base plate 9 in the beam direction. The left bent portion 9a serves as a back board for preventing water on the base plate 9 from entering to the left outer side. On the other hand, a right bent portion 9b that is bent toward the back side to form a U shape in cross section is formed at the other end (right end) of the base plate 9 in the beam direction. Such a lock seam structure forms a "draining structure" for preventing rain water or the like from entering the surface of the roof substrate 3 when the solar cell modules 5 are arranged in the beam direction on the roof substrate 3. The "draining structure" will be described in detail in the section of a "roof structure" below.

Figure 4B:
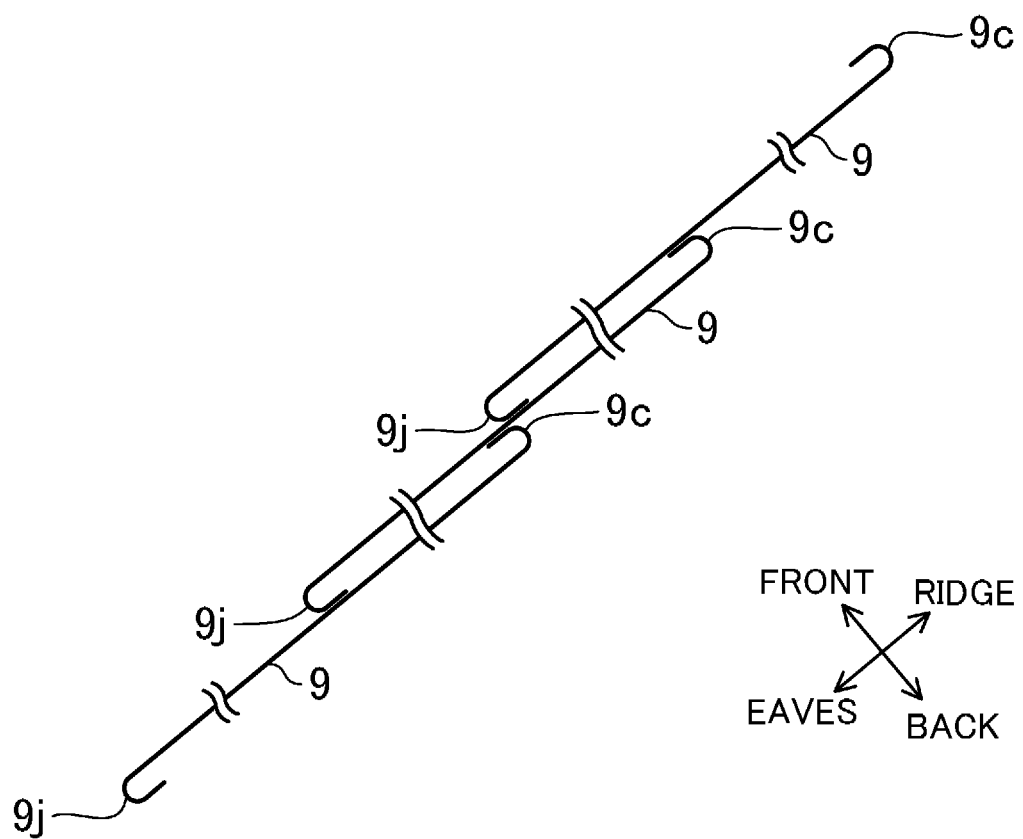
FIG. 4B A cross-sectional view of the base plate taken along line IVb-IVb.

As illustrated in FIG. 4B, a ridge-side bent portion 9c that is bent toward the front side to form a U shape in cross section is formed at one end (ridge-side end) of the base plate 9 in the eaves-ridge direction, and extends over the entire length except for the right end. The ridge-side bent portion 9c serves as a back board for preventing water on the base plate 9 from flowing outward in the ridge direction. On the other hand, an eaves-side bent portion 9j that is bent toward the back side to form a U shape in cross section is formed at the other end (eaves-side end) of the base plate 9 in the eaves-ridge direction. In the manner described above, a lock seam structure is also formed in the eaves-ridge direction and serves as "draining structures" in a manner similar to the case of FIG. 4A, when the solar cell modules 5 are arranged in the eaves-ridge direction. This "draining structure" will also be described in detail in the section of the "roof structure" below.

In FIG. 4A, the left bent portion 9a and the right bent portion 9b are bent to form U shapes in cross section, but the present invention is not limited to this example. For example, each of the left bent portion 9a and the right bent portion 9b may be bent to form an L shape in cross section, or may be folded to be completely crushed in the front-back direction. Similarly, each of the ridge-side bent portion 9c and the eaves-side bent portion 9j (see FIG. 4B) is not limited to the U shape in cross section, and may be bent to form an L shape in cross section or may be folded to have a shape crushed in the front-back direction.

As illustrated in FIG. 5, the eaves side (edge) of the base plate 9 extends substantially horizontally, whereas the ridge side (edge) of the base plate 9 tilts to one side in the beam direction (to the right in FIG. 5) toward the eaves with respect to the eaves side of the base plate. Accordingly, even in a case where the solar cell modules 5 are arranged side by side in the beam direction with end portions of the base plates 9 in the beam direction overlapping with one another, the ridge-side bent portions 9c do not overlap with each other, and steps in the thickness direction are hardly formed between the base plates 9.

A U-shaped notch 9d is formed in a portion of the ridge-side edge of each base plate 9 adjacent to the right of the ridge-side bent portion 9c. Six ridge-side attachment holes 9e are formed to penetrate portions of the base plate 9 near the ridge-side edge, and are arranged with intervals in the beam direction.

A pair of ridge-side bulges 9f (see FIG. 2) bulging to the front side is disposed with an interval in the beam direction on the ridge-side end of the base plate 9. Each of the ridge-side bulges 9f has a rectangular shape elongated in the beam direction in plan view. Each of the ridge-side bulges 9f has a pair of ridge-side screw insertion holes 9g (see FIG. 3) disposed with an interval in the beam direction. A pair of eaves-side bulges 9h (see FIG. 2) bulging to the front side and open to the eaves side is disposed with an interval in the beam direction on portions of lower ends of the base plate 9 opposite to the ridge-side bulges 9f in the eaves-ridge direction (flow direction). Each of the eaves-side bulges 9h has an approximately pentagon shape in which a ridge-side end portion is gradually tapered toward the ridge side and a region except for an upper end portion extends with a constant width in the eaves-ridge direction in plan view. Each of the eaves-side bulges 9h has a pair of eaves-side screw insertion holes 9i (see FIG. 3) disposed with an interval in the beam direction. A bulging height H1 (see FIG. 10) of each of the eaves-side bulges 9h is larger than a bulging height H2 (see FIG. 10) of each of the ridge-side bulges 9f.

—Cushioning Member—

On the front face of each base plate 9 (the face toward the roof substrate 3), two substantially plate-shaped cushioning members 13 each having a rectangular shape in plan view are disposed to be spaced from each other with the plate faces extending along the front face of the base plate 9, and are disposed with a spacing with the outer peripheral edge of the base plate 9. The cushioning member 13 is made of a resin having at least one of a shock absorbing function or a heat insulating function, such as polystyrene foam.

Figure 6:
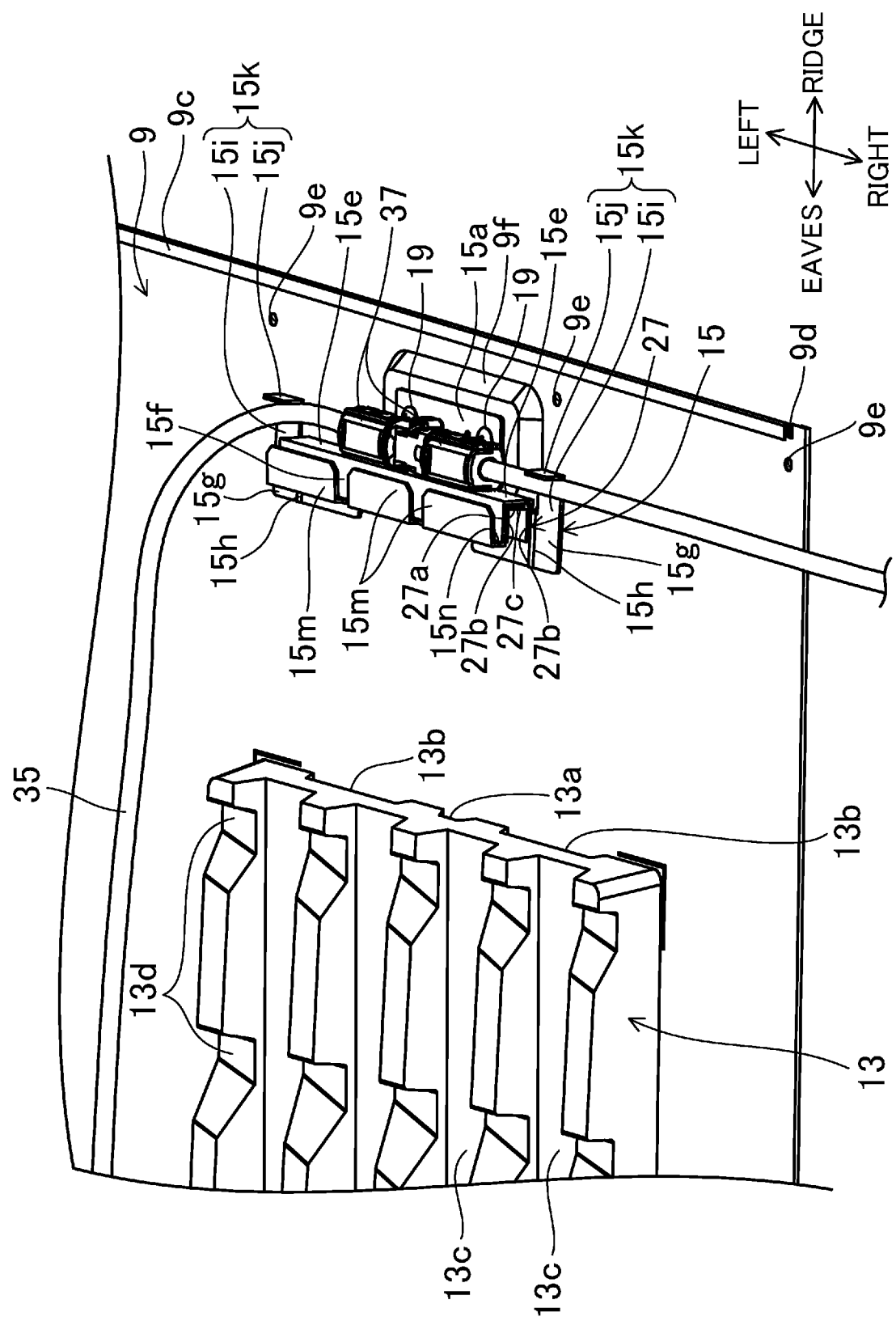
FIG. 6 A perspective view of a cable, a ridge-side frame member, a gasket, and a portion of the base plate around the ridge-side frame member.

As illustrated in FIG. 6, on the back face of the cushioning member 13, a first back-side groove 13a (corresponding to a first groove) and two second back-side grooves 13b (corresponding to first grooves) are formed with intervals in the beam direction. Each of the first and second back-side grooves 13a and 13b has a shallow pan shape in plan view that gradually increases in width toward the back side in the front-back direction, and extends over the entire length in the eaves-ridge direction. Accordingly, spaces each having a trapezoidal shape in cross section, extending in the eaves-ridge direction, and used for allowing rain water or the like to pass therethrough are formed between the first back-side groove 13a and the base plate 9 and between the base plate 9 and the second back-side grooves 13b. The shape, number, and arrangement, for example, of the first grooves (the first back-side groove 13a and the two second back-side grooves 13b) are not specifically limited. For example, each of the first grooves may have other shapes such as a semicircular shape in cross section. FIG. 6 shows an example in which the first back-side groove 13a is sandwiched between the two second back-side grooves 13b in the beam direction. In FIG. 6, the first back-side groove 13a is narrower than the second back-side grooves 13b from the viewpoint of easiness in positioning between the center of the cushioning member 13 and the center of the eaves-side bulges 9h of the base plate 9 in the beam direction.

On the other hand, on the front face of the cushioning member 13, four first front-side grooves 13c (corresponding to third grooves) are formed with intervals in the beam direction. Each of the first front-side grooves 13c has a shallow pan shape in plan view that gradually increases in width toward the front side in the front-back direction, and extends over the entire length in the beam direction. Accordingly, a space having a trapezoidal shape in cross section and extending in the eaves-ridge direction is formed between the solar cell panel 11 and each of the first front-side grooves 13c. In other words, the front face of the cushioning member 13 has, for example, five regions where the first front-side grooves 13c are not formed (hereinafter referred to as non-formation regions where no first front-side grooves 13c are formed) elongated in the eaves-ridge direction, and these non-formation regions support intermediate portions of the solar cell panel 11 in the beam direction and the eaves-ridge direction. Accordingly, air permeability is obtained at the back side of the solar cell panels 11 so that a temperature rise of the solar cell panels 11 can be reduced. The number of non-formation regions without the first front-side grooves 13c is not limited to five, and may be four or less or six or more, depending on, for example, the size of the cushioning member 13.

On the non-formation regions where no first front-side grooves 13c are formed, three second front-side grooves 13d (corresponding to second grooves) are formed with intervals in the eaves-ridge direction, and each has a shallow pan shape in plan view that gradually increases in width toward the front side in the front-back direction and extends over the entire length in the beam direction. Accordingly, a space having a trapezoidal shape in cross section and extending in the eaves direction is formed between the solar cell panel 11 and each of the second front-side grooves 13d.

The shape, number, and arrangement of grooves formed on the front face of the cushioning member 13 are not limited to those of the first front-side grooves 13c and the second front-side grooves 13d described above.

From the viewpoint of smoothly draining water on the front face of the cushioning member 13, (1) eaves-side walls of the second front-side grooves 13d are tilted in the eaves direction to one side in the beam direction (to the right in FIG. 2), and (2) the depth of the first front-side grooves 13c is larger than the depth of the second front-side grooves 13d.

A region on the back face of the cushioning member 13 where none of the first back-side groove 13a and the second back-side grooves 13b are formed is bonded to the front face of the base plate 9 with a double face tape. A region on the front side face of the cushioning member 13 where none of the first front-side grooves 13c and the second front-side grooves 13d is formed is not bonded to the back face of the solar cell panel 11.

—Ridge-Side Frame Member—

Figure 7:
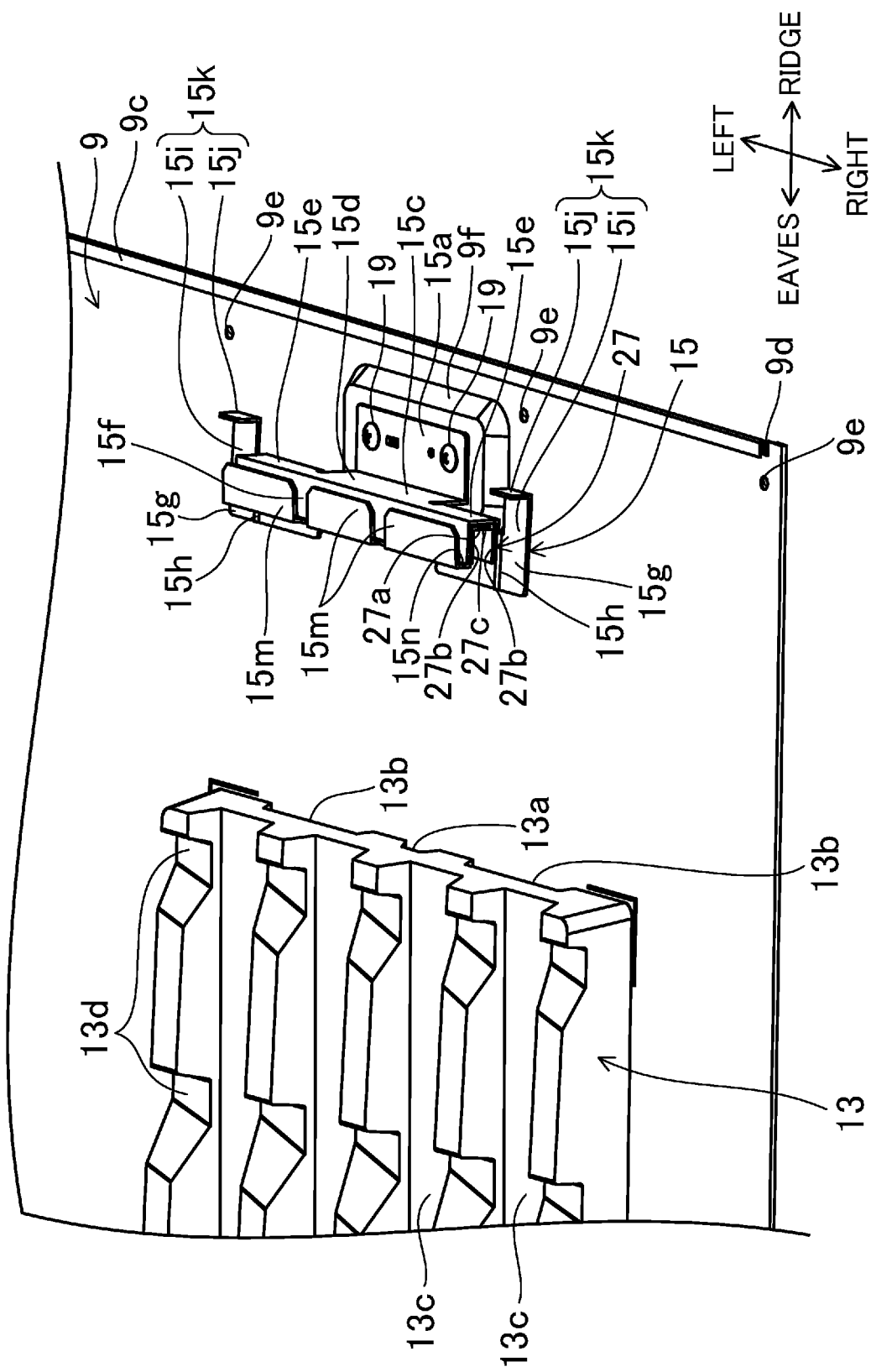
FIG. 7 A perspective view of the ridge-side frame member, the gasket, and the portion of the base plate around the ridge-side frame member.

As illustrated in FIG. 7, metal ridge-side frame members 15 (corresponding to ridge-side support members) supporting ridge-side ends of the solar cell panels 11 are attached to the front sides of the ridge-side bulges 9f of the base plates 9, and are arranged with intervals in the beam direction. Rectangular ridge-side auxiliary plates 17 are attached to the back side of each ridge-side bulge 9f at positions corresponding to the ridge-side frame members 15 (see FIG. 3). Each of the ridge-side auxiliary plates 17 has a pair of ridge-side fastening holes 17a disposed with an interval in the longitudinal direction.

Each ridge-side frame member 15 includes an attachment portion 15a having a rectangular plate shape in plan view, having one side in contact with the base plate 9, and extending in the beam direction. The attachment portion 15a includes a pair of ridge-side screw holes 15b (see FIG. 3) disposed with an interval in the longitudinal direction (beam direction) and corresponding to the ridge-side screw insertion holes 9g of the base plate 9. A plate-shaped elevation portion 15c projecting to the front side of the base plate 9 with the plate face thereof oriented in the eaves-ridge direction is integrally formed on the eaves-side edge of the attachment portion 15a extending in the longitudinal direction. The elevation portion 15c has an approximately T shape in plan view constituted by a center portion 15d having the same width as that of the attachment portion 15a, and a pair of expansion portions 15e expanding to both sides in the beam direction from a portion of the center portion 15d except for a base portion. A first holding wall 15f projecting toward the eaves side is integrally formed on the distal edge of the elevation portion 15c, that is, on the center portion 15d and the distal edge of the elevation portion 15c of the expansion portions 15e. At the proximal edge of the elevation portion 15c of each end edge expansion portion 15e, a second holding wall 15g as a ridge-side contact face integrally projects to face the first holding wall 15f and jut out from the first holding wall 15f to both outer sides in the beam direction. On portions of the second holding wall 15g facing both edges of the first holding wall 15f in the beam direction, rib portions 15h as ridge-side projections extending in the eaves-ridge direction integrally project toward the front side. On portions of the second holding wall 15g jutting outward in the beam direction, expansion walls 15i expanding to the ridge side are integrally formed to be flush with the second holding walls 15g, and projecting strip portions 15j integrally project from the front ends of the expansion walls 15i toward the front side. The expansion walls 15i and the projecting strip portions 15j constitute cable hooks 15k (corresponding to holders) for holding a cable at a predetermined height. Three bent walls 15m projecting to the front side and bent toward the ridge side integrally project from the front edge of the first holding wall 15f and are arranged with intervals in the beam direction. The bent walls 15m and the first holding wall 15f form grooves 15n that extend in the beam direction, are open to the ridge side, and serve as engagement portions.

The ridge-side frame members 15 configured as described above are fastened to the base plate 9 by sequentially inserting screws 19 in the ridge-side screw holes 15b of the attachment portions 15a of the ridge-side frame members 15, the ridge-side screw insertion holes 9g of the base plate 9, and the ridge-side fastening holes 17a of the ridge-side auxiliary plates 17 from the front side.

—Eaves-Side Frame Member—

Figure 8:
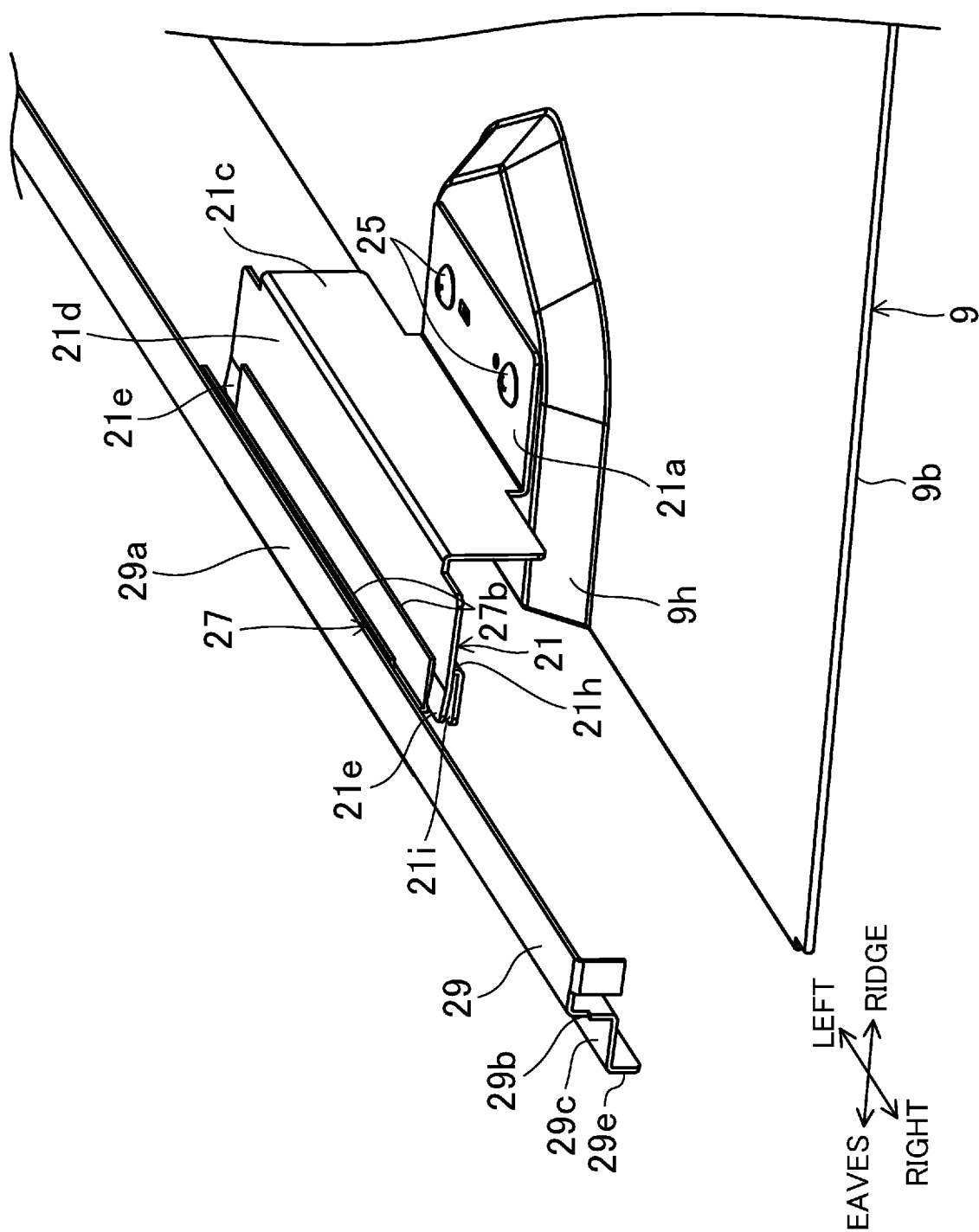
FIG. 8 A perspective view of an eaves-side frame member, a gasket, a cover member, and a portion of the base plate around the eaves-side frame member.
Figure 9:
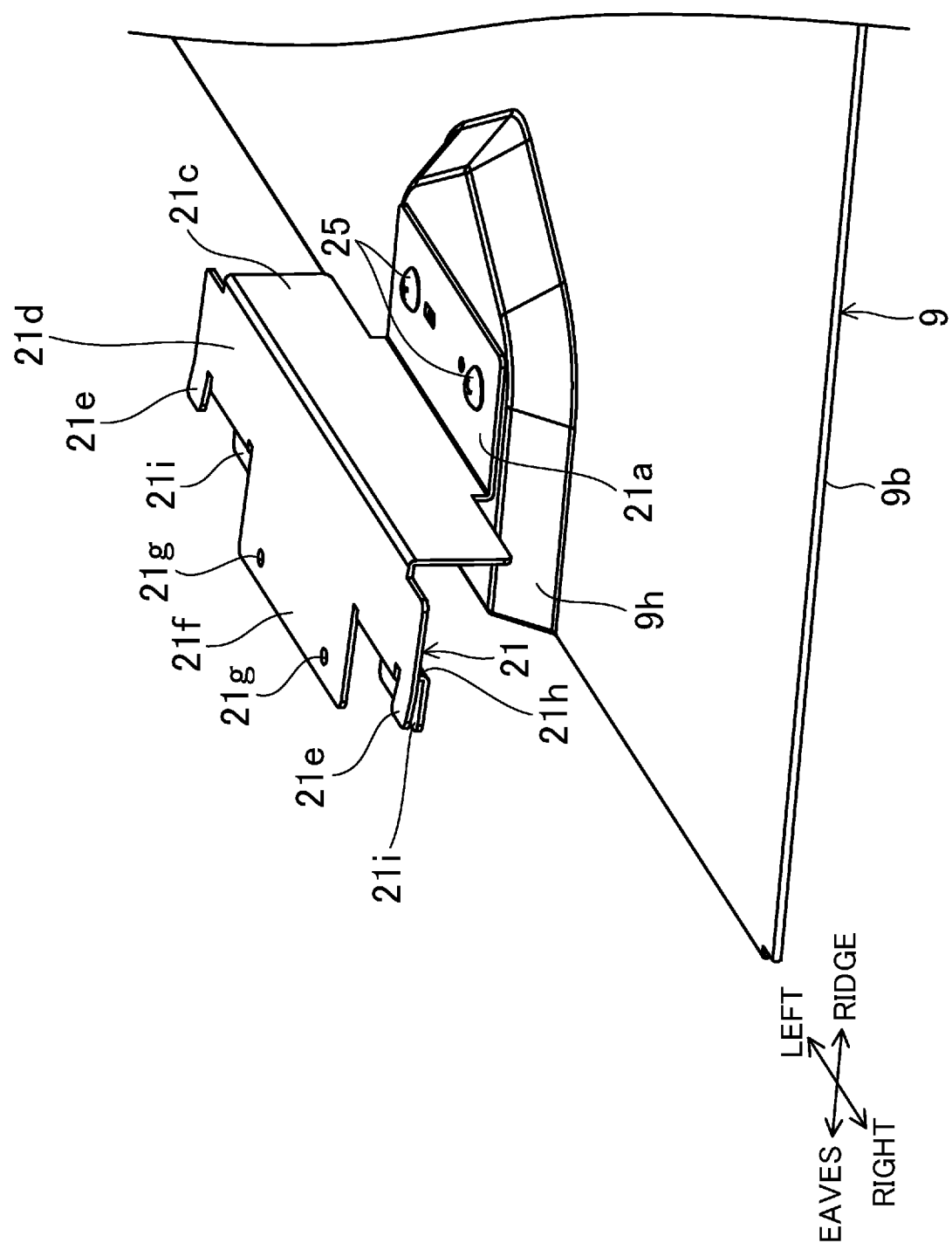
FIG. 9 A perspective view of the eaves-side frame member, and a portion of the base plate around a lower frame member.

As illustrated in FIGS. 8 and 9, a metal eaves-side frame member 21 (corresponding to an eaves-side support member) supporting an eaves-side end of the solar cell panel 11 is attached to each of eaves-side bulge 9h of the base plate 9 at a position facing the ridge-side frame member 15 in the eaves-ridge direction with an interval in the beam direction. As a position corresponding to the ridge-side frame member 15, a rectangular eaves-side auxiliary plate 23 is attached to the back side of each eaves-side bulge 9h (see FIG. 3). The eaves-side auxiliary plate 23 has a pair of eaves-side fastening holes 23a with an interval in the longitudinal direction.

The eaves-side frame member 21 includes a plate-shaped attachment wall 21a having one face in contact with the base plate 9, elongated in the beam direction, and having a rectangular shape in plan view. The attachment wall 21a has a pair of eaves-side screw holes 21b (see FIG. 3) corresponding to the eaves-side screw insertion holes 9i of the base plate 9 and disposed with an interval in the longitudinal direction (beam direction). A plate-shaped standing wall 21c projecting to the front side of the base plate 9 with the plate face thereof oriented in the eaves-ridge direction is integrally formed at the eaves-side edge of the attachment wall 21a of the base plate 9. The both ends of the standing wall 21c in the beam direction projects outward from the attachment wall 21a in the beam direction. A long plate portion 21d having an approximately rectangular shape in plan view and having a plate face oriented in the front-back direction integrally projects on the front edge of the standing wall 21c with both longitudinal ends thereof jutting out from the standing wall 21c in the beam direction. A pair of plate-shaped projecting walls 21e integrally projects from both ends, in the beam direction, of the front edge of the long plate portion 21d, and tilts to the front side toward the eaves side. Accordingly, the proximal ends of the projecting walls 21e are slightly bent. A plate-shaped center wall 21f integrally projects from a center portion, in the beam direction, of the front edge of the long plate portion 21d toward the eaves side, and is disposed with an interval from the projecting walls 21e. A pair of frame-side through holes 21g is disposed with an interval in the beam direction near the front end of the center wall 21f. A plate-shaped step-forming plane portion 21h integrally projects to the back side between a portion from which the projecting walls 21e projects and a portion from which the center wall 21f projects on the front edge of the long plate portion 21d. A projecting strip 21i extending in the beam direction and projecting to the eaves side integrally projects from the front end of the step-forming plane portion 21h. Relative positions of the projecting strips 21i of the right eaves-side frame member 21 and the groove 15n of the right ridge-side frame member 15 relative to the solar cell panel 11 in the beam direction are identical, and relative positions of the projecting strips 21i of the left eaves-side frame member 21 and the groove 15n of the left ridge-side frame member 15 relative to the solar cell panel 11 in the beam direction are also identical.

The eaves-side frame members 21 configured as described above are fastened to the base plate 9 by sequentially inserting screws 25 in the eaves-side screw holes 21b of the attachment walls 21a of the eaves-side frame members 21, the eaves-side screw insertion holes 9i of the base plate 9, and the eaves-side fastening holes 23a of the eaves-side auxiliary plates 23, from the front side.

—Solar Cell Panel—

The solar cell panel 11 has a rectangular shape, and is disposed with the longitudinal direction thereof oriented in the beam direction. The front and back faces of the solar cell panel 11 tilt to be separated away from the front face of the base plate 9 toward the eaves side.

The solar cell panel 11 is formed in the following manner First, a transparent electrode layer of, for example, tin oxide, an optical semiconductor layer, and a back-side electrode layer of, for example, a metal, are sequentially formed on a glass substrate back side having a laterally elongated rectangular shape of 551×908 mm. These layers are patterned by, for example, laser processing, thereby forming a power generation portion and a wiring portion. After a solar cell device including such power generation portions and wiring portions are arranged, a surface on which the solar cell device is formed is sealed and protected with, for example, ethylene-vinyl acetate copolymer (EVA), a filler such as polyolefin, glass, a PET film, or a tedlar film.

—Gasket—

Figure 10:
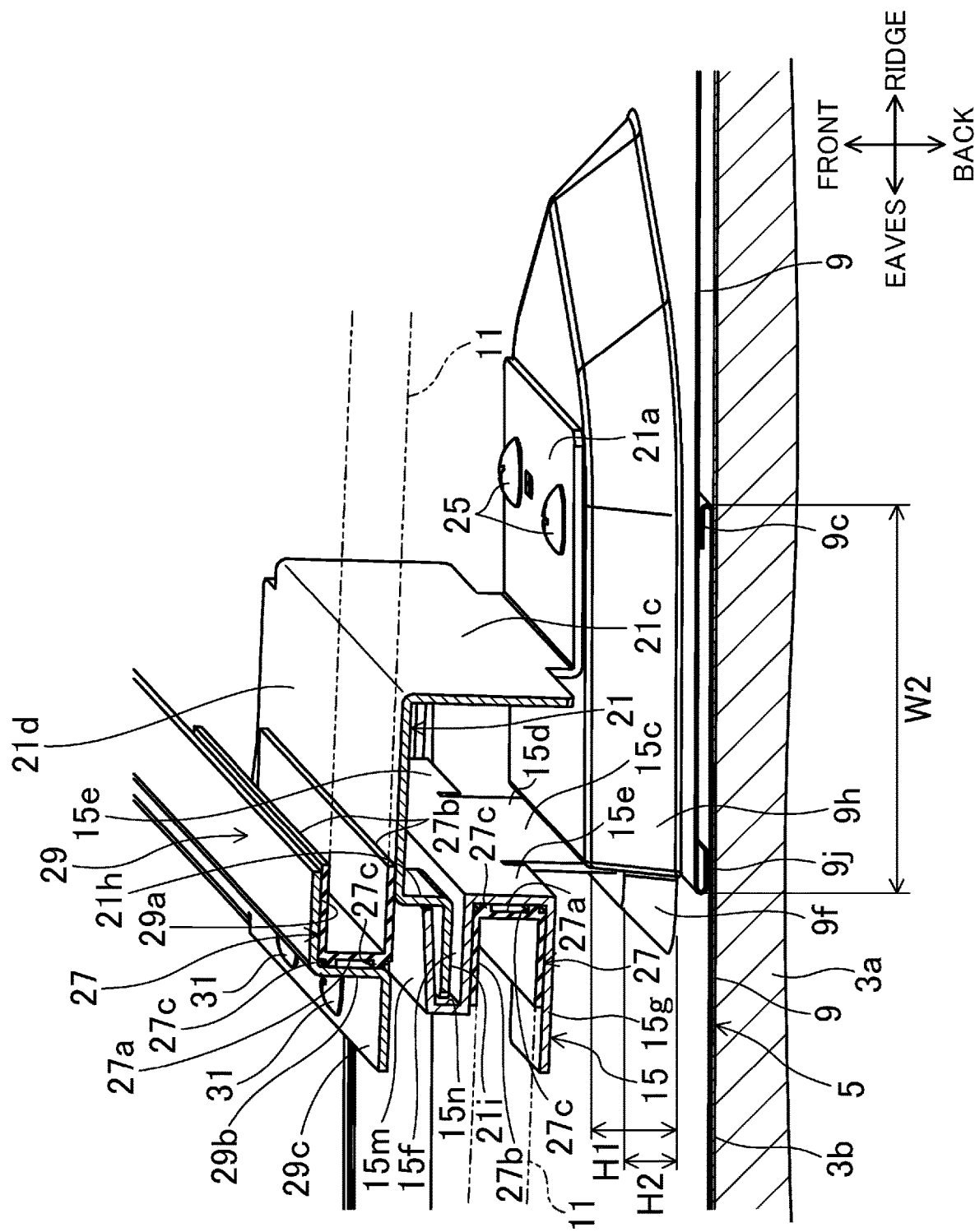
FIG. 10 A cross-sectional view taken along line X-X in in FIG. 1B.

A pair of long rubber gaskets 27 each extending in an approximately U shape in cross section is attached to the ridge-side end of each solar cell panel 11, and is disposed with an interval in the beam direction. As illustrated in FIG. 10, the gaskets 27 includes a long plate-shaped coupling wall 27a and a pair of long plate-shaped opposing walls 27b projecting on both edges of the coupling wall 27a extending in the longitudinal direction. A pair of ribs 27c extending in the longitudinal direction of the coupling wall 27a projects with an interval on the face of the coupling wall 27a on which the opposing walls 27b project.

The opposing walls 27b of the gaskets 27 hold the ridge-side end of the solar cell panel 11 at both sides in the thickness direction. The first holding wall 15f and the second holding wall 15g of the ridge-side frame member 15 hold the gaskets 27 and the ridge-side end of the solar cell panel 11. Accordingly, the second holding wall 15g of the ridge-side frame member 15 is in contact with the gaskets 27 at the back side of the solar cell panel 11. On the other hand, the rib portion 15h (see, for example, see FIG. 7) of the ridge-side frame member 15 projects relative to the second holding wall 15g toward the front direction of the solar cell panel 11 and face the gaskets 27 at both outer sides in the beam direction, thereby restricting movement of the gaskets 27 in the beam direction. The elevation portion 15c of the ridge-side frame member 15 is in contact with the ribs 27c of the gaskets 27 from the ridge side. The grooves 15n of the ridge-side frame member 15 are located at the front side of the ridge-side end of the solar cell panel 11 to which the ridge-side frame member 15 is attached. In this manner, the pair of ridge-side frame members 15 attached to the common base plate 9 is attached to the ridge-side end of the solar cell panel 11 with the gaskets 27 interposed therebetween, and disposed with an interval in the beam direction.

On the other hand, in a manner similar to the ridge-side end, gaskets 27 as a pair of eaves-side holding members are attached to the eaves-side end of the solar cell panel 11 and are disposed with an interval. The base portion of the center wall 21f of the eaves-side frame member 21 is in contact with the gaskets 27 at the back side of the solar cell panel 11. Accordingly, the projecting strip 21i of the eaves-side frame member 21 is located at the back side of the eaves-side end of the solar cell panel 11 to which the eaves-side frame member 21 is attached. The projecting walls 21e of the eaves-side frame member 21 project relative to the center wall 21f toward the front side of the solar cell panel 11 at both outer sides of the center wall 21f in the beam direction, and face the gasket 27 at both outer sides in the beam direction, thereby restricting movement of the gaskets 27 in the beam direction.

In addition, on the opposing walls 27b of the gaskets 27 attached to the eaves-side end of each solar cell panel 11 toward the front side of the solar cell panel 11, a long cover member 29 is attached to cover the eaves-side end of the solar cell panel 11 over the entire length thereof. The cover member 29 includes a long plate-shaped first face 29a facing the front side of the eaves-side end of the solar cell panel 11 and covers the eaves-side end over the entire length thereof, a long plate-shaped second face 29b extending from the eaves-side edge of the first face 29a toward the back side and covering the eaves-side end face of the solar cell panel 11 over the entire length thereof, and a long plate-shaped third face 29c extending from the back side edge of the second face 29b toward the eaves side. A region of the third face 29c to which the gaskets 27 are attached has a pair of cover-side through holes 29d (see FIG. 3) disposed with an interval in the longitudinal direction. A long plate-shaped fourth face 29e extending to the back side of the solar cell panel 11 is formed on the eaves-side edge of a portion of the third face 29c except a region to which the gaskets 27 are attached.

The cover member 29 configured as described above is fastened to the eaves-side frame member 21 by sequentially inserting screws 31 into the cover-side through holes 29d of the third face 29c of the cover member 29, and the frame-side through holes 21g of the eaves-side frame member 21 from the front side of the solar cell panel 11. In this manner, the pair of eaves-side frame members 21 attached to the common base plate 9 is attached to the eaves-side end of the solar cell panel 11 with the gaskets 27 interposed therebetween, and is disposed with an interval in the beam direction.

—Terminal Box, Cable, Cable Hook (Structure for Holding Cable)—

A terminal box 33 is disposed at a position on the front face of the base plate 9 closer to the eaves side than the cushioning member 13 and sandwiched by the cushioning member 13 in the beam direction. The terminal box 33 houses base portions of a pair of cables 35, and a connector 37 is connected to a front end of each of the cables 35. The connector 37 is used for connection to a connector 37 of an adjacent solar cell module 5 and connection to a connector (not shown) of a cable drawn from a power conditioner (not shown).

Each of the cables 35 is held by the cable hook 15k such that the connector 37 connected to the front end is disposed near the cable hook 15k.

Specifically, one of the cables 35 (e.g., the right cable, hereinafter also referred to as a "right cable 35") is held at a predetermined height by placing a vicinity of the front end in contact with the front side of the cable hook 15k at the left of the right ridge-side frame member 15. At this time, the connector 37 of the right cable 35 is located at the ridge side of the expansion portion 15e of the ridge-side frame member 15.

An intermediate portion of the other cable 35 (e.g., the left cable, hereinafter also referred to as a "left cable 35") in the longitudinal direction is held by the cable hook 15k of the left ridge-side frame member 15. Specifically, the intermediate portion of the left cable 35 in the longitudinal direction is held at a predetermined height by passing the left cable 35 over the top of the left cable hook 15k by way of a space under the right cable hook 15k of the left ridge-side frame member 15.

The left cable 35 extends toward the ridge-side frame member 1 at the right of the solar cell module 5 adjacent to the left side of the left cable 35. The connector 37 of the left cable 35 is connected to the connector 37 of the right cable 35 of the solar cell module 5 adjacent to the left of the connector 37 of the left cable 35. At this time, the left cable 35 is placed such that a vicinity of the front end of the left cable 35 is in contact with the front side of the right cable hook 15k of the right ridge-side frame member 15 of the solar cell module 5 adjacent to the left of the left cable 35. Accordingly, the connector of the left cable 35 is held at a predetermined height. At this time, the connector 37 of the left cable 35 is located at the ridge side of the expansion portions 15e of the ridge-side frame member 15.

In addition, the ridge side of the expansion portion 15e of the ridge-side frame member 15 is covered with the standing wall 21c and the long plate portion 21d of the eaves-side frame member 21 of the solar cell module 5 adjacent to the ridge side of the expansion portion 15e (see FIG. 10). In this manner, a connection portion between the connectors 37 of the left cable 35 and the right cable 35 of the adjacent solar cell modules 5 is protected against entering of, for example, water and dust from the front and in the eaves-ridge direction.

<Roof Structure>

With reference to FIGS. 1A and 1B again, a roof structure formed by arranging and constructing the building material-integrated solar cell modules 5 (hereinafter referred to simply as a roof structure) will be described.

The solar cell modules 5a to 5f configured as described above are arranged and constructed such that the back sides of the base plates 9 are in contact with the front side of the roof substrate 3 (waterproof sheet 3b) and positions of the solar cell panels 11 adjacent to each other in the eaves-ridge direction are shifted by ½ in the beam direction.

Specifically, a left half of the solar cell panel 11 of the solar cell module 5a is adjacent to the right half of the solar cell panel 11 of the solar cell module 5d from the eaves side, and a right half of the solar cell panel 11 of the solar cell module 5*b* is adjacent to a left half of the solar cell panel 11 of the solar cell module 5*d* from the eaves side. Similarly, a left half of the solar cell panel 11 of the solar cell module 5*b* is adjacent to the right half of the solar cell panel 11 of the solar cell module 5*e* from the eaves side, and a right half of the solar cell panel 11 of the solar cell module 5*c* is adjacent to a left half of the solar cell panel 11 of the solar cell module 5*e* from the eaves side. A left half of the solar cell panel 11 of the solar cell module 5*d* is adjacent to a right half of the solar cell module 5*f* from the eaves side, and a right half of the solar cell panel 11 of the solar cell module 5*e* is adjacent to a left half of the solar cell module 5*f* from the eaves side.

In each two of the solar cell modules 5*a* to 5*f* adjacent to each other in the eaves-ridge direction, the eaves-side bulges 9*h* of the base plates 9 of the ridge-side solar cell module 5*d* to 5*f* overlap the ridge-side bulges 9*f* of the base plates 9 of the eaves-side solar cell modules 5*a* to 5*e* from the front side of the base plates 9.

Then, as illustrated in FIG. 10, in two solar cell panels 11 adjacent to each other in the eaves-ridge direction, the projecting strips 21*i* of the eaves-side frame member 21 attached to a portion of the ridge-side solar cell panel 11 adjacent to the eaves-side solar cell panel 11 are inserted in and engaged with the grooves 15*n* of the ridge-side frame member 15 attached to a portion of the eaves-side solar cell panel 11 adjacent to the ridge-side solar cell panel 11. Thus, the projecting strips 21*i* of the left eaves-side frame member 21 of the solar cell panel 11 of the solar cell module 5*e* are inserted in and engaged with the grooves 15*n* of the right ridge-side frame member 15 of the solar cell panel 11 of the solar cell module 5*b* adjacent to the eaves sides of the solar cell panels 11 of the solar cell modules 5*d* and 5*e*. The projecting strips 21*i* of the right eaves-side frame member 21 of the solar cell panel 11 of the solar cell module 5*d* are inserted in and engaged with the grooves 15*n* of the left ridge-side frame member 15 of the solar cell panel 11 of the solar cell module 5*b*.

Figure 11:
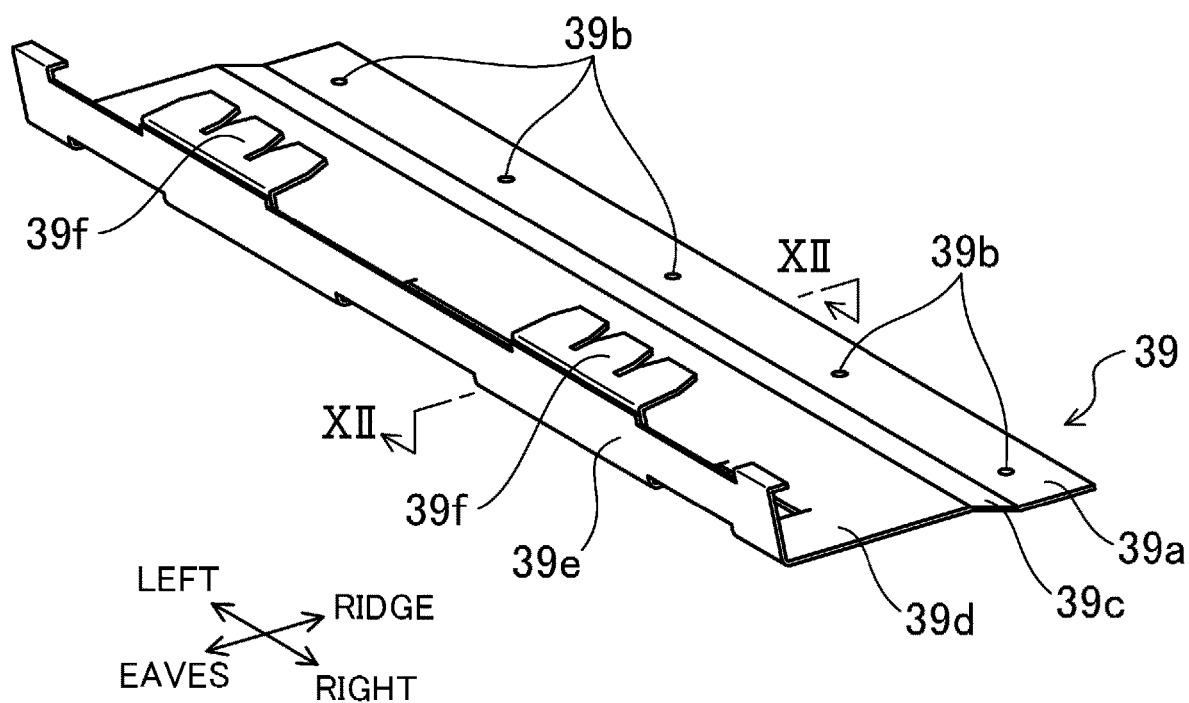
FIG. 11 A perspective view of an eaves-side member.
Figure 12:
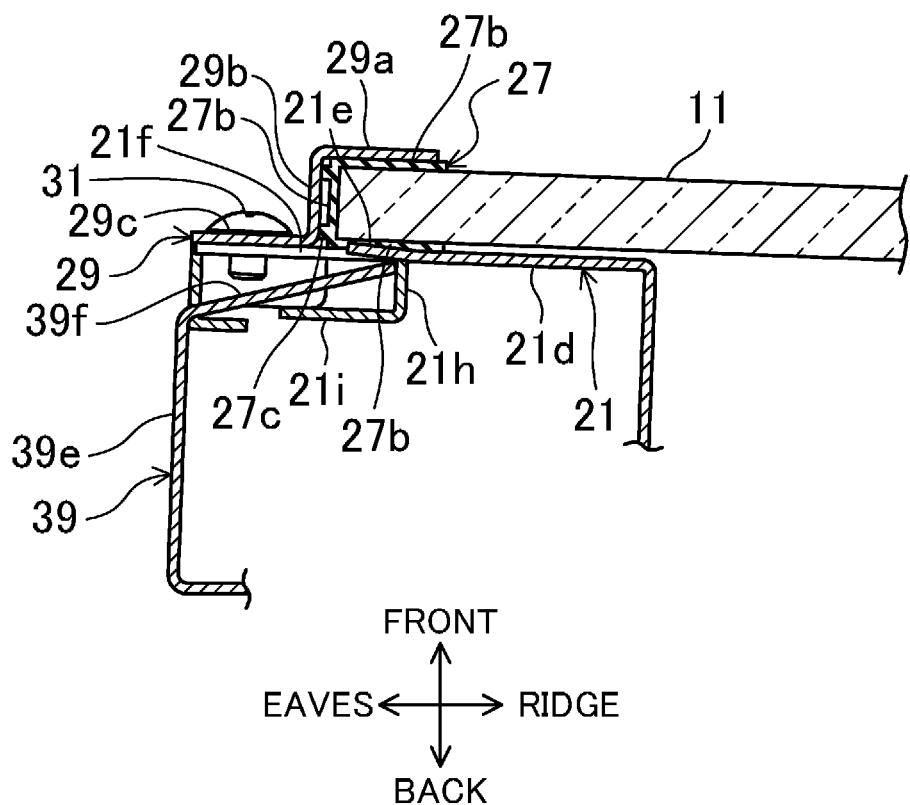
FIG. 12 A cross-sectional view taken along line XII-XII in FIG. 11.

An eaves-side member 39 illustrated in FIGS. 11 and 12 is attached to each of the eaves-side frame members 21 of the solar cell modules 5*a* to 5*c* to which no solar cell modules 5 are adjacent to the eaves side thereof. The eaves-side member 39 includes a long plate-shaped attachment plate portion 39*a* having one face in contact with the waterproof sheet 3*b* and extending in the beam direction. The attachment plate portion 39*a* has five eaves-side attachment holes 39*b* arranged with intervals in the beam direction. Screws (not shown) are inserted in and fasten to the eaves-side attachment holes 39*b*, the waterproof sheet 3*b*, and the roof substrate 3 so that the eaves-side member 39 is thereby fixed to the roof substrate 3. At the eaves-side edge of the attachment plate portion 39*a* extending in the longitudinal direction, a tilt plate portion 39*c* tilting to the front side of the roof substrate 3 toward the eaves side extends to the same direction as the attachment plate portion 39*a* in the beam direction. At an expansion end of the tilt plate portion 39*c*, an expansion plate portion 39*d* extending substantially in parallel with the attachment plate portion 39*a* extends to the same direction as the attachment plate portion 39*a* in the beam direction. On the expansion end of the expansion plate portion 39*d*, an upright plate portion 39*e* stands toward the front side of the roof substrate 3. On the front end of the upright plate portion 39*e*, a pair of plate-shaped insertion portions 39*f* having plate faces oriented in front-back direction of the roof substrate 3 projects toward the ridge side and is disposed with an interval in the beam direction. The insertion portions 39*f* face the projecting strip 21*i* of the eaves-side frame member 21 from the front side of the base plate 9 to restrict movement of the eaves-side frame member 21 to the front side of the base plate 9, and also face the center wall 21*f* of the eaves-side frame member 21 from the back side of the base plate 9 to restrict movement of the eaves-side frame member 21 to the back side. This can prevent the eaves-side frame member 21 from wobbling in the front-back direction.

Figure 13:
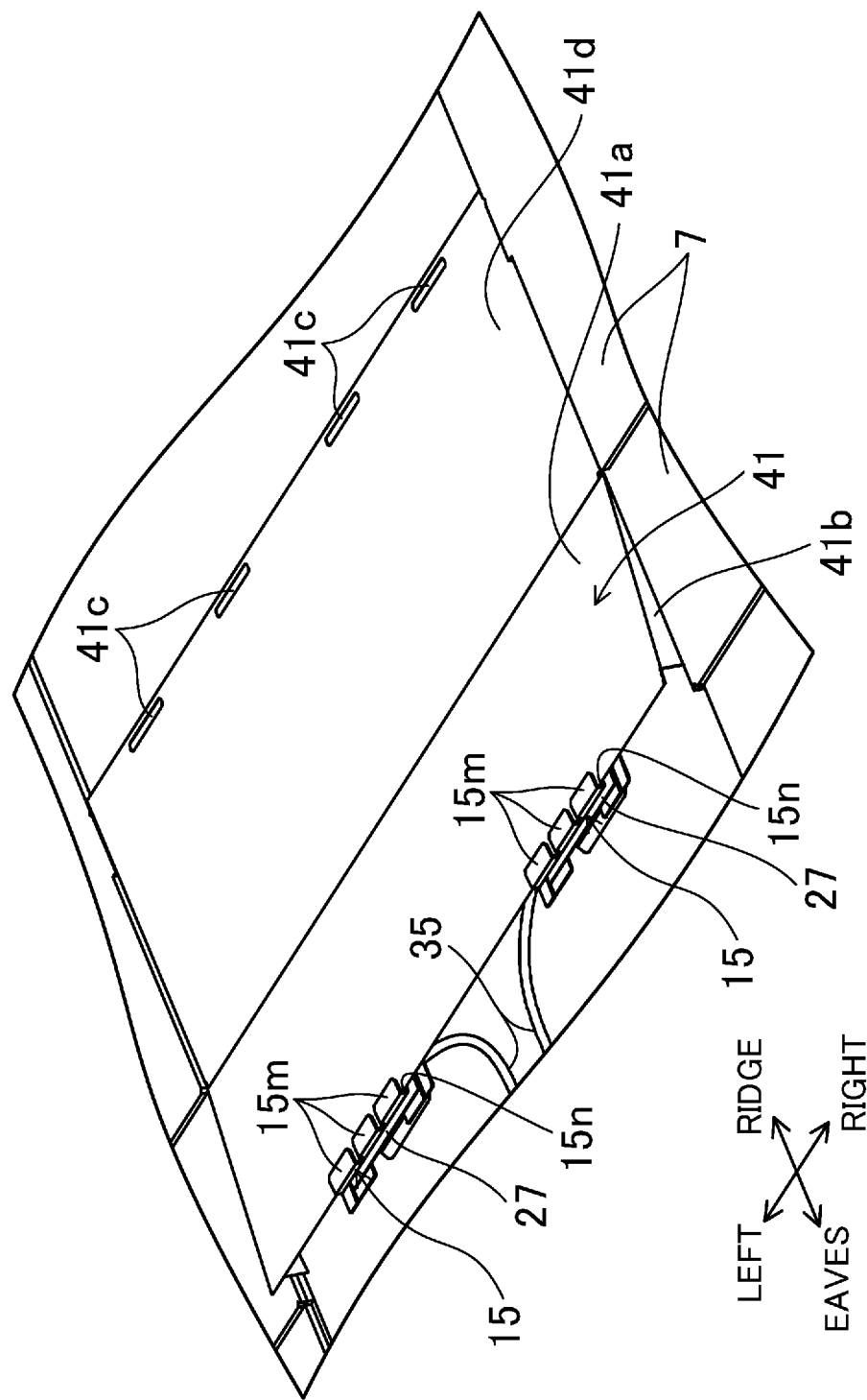
FIG. 13 A perspective view of a first ridge-side cover and a vicinity thereof.

A first ridge-side cover 41 is provided at the ridge side of the solar cell panel 11 to which no solar cell panel 11 is adjacent at the ridge side, that is, the ridge side of the solar cell panel 11 of the solar cell module 5*f*. The first ridge-side cover 41 includes a plate-shaped first principal face 41*a*, and a first ridge-side plate portion 41*d* located at the ridge side of the first principal face 41*a*. The first principal face 41*a* covers the front side of the roof substrate 3 (waterproof sheet 3*b*) at the ridge side of the solar cell module 5*f*. The front side of the first ridge-side plate portion 41*d* located at the ridge side of the first principal face 41*a* is covered with the slate 7 disposed at the ridge side of the first ridge-side cover 41 (see FIG. 1A). FIG. 13 does not show the slate 7 covering the first ridge-side plate portion 41*d*. First side faces 41*b* project to the back side on both edges of the first principal face 41*a* in the beam direction. The first ridge-side plate portion 41*d* of the first principal face 41*a* of the first ridge-side cover 41 have four screw holes 41*c* arranged with intervals in the beam direction. Screws (not shown) are inserted in and fastened to the screw holes 41*c* and the roof substrate 3 so that the first ridge-side plate portion 41*d* of the first ridge-side cover 41 and the slates 7 are thereby fixed to the roof substrate 3 (jointed).

As also illustrated in FIG. 13, the eaves-side end of the first principal face 41*a* of the first ridge-side cover 41 is inserted in and engaged with the grooves 15*n* of the ridge-side frame members 15 of the solar cell module 5*f*.

A second ridge-side cover 43 is provided at the ridge side of a portion of the solar cell panel 11 (the solar cell panel 11 of each of the solar cell modules 5*a*, 5*c*, 5*d*, and 5*e*) having a half in the beam direction adjacent to the eaves sides of the slates 7. The second ridge-side cover 43 includes a plate-shaped second principal face 43*a* and a second ridge-side plate portion 43*d* located at the ridge side of the plate-shaped second principal face 43*a*. The second principal face 43*a* covers the front side of the roof substrate 3 (waterproof sheet 3*b*) at the ridge side of the solar cell module 5 (e.g., the solar cell modules 5*a*, 5*c*, 5*d*, and 5*e*) adjacent to the eaves side of the second principal face 43*a*. The front side of the second ridge-side plate portion 43*d* at the ridge side of the second principal face 43*a* is covered with the slate 7 at the ridge side of the second ridge-side cover 43 (see FIG. 1A). The second side face 43*b* projects toward the back side on both edges of the second principal face 43*a* in the beam direction. The second ridge-side plate portion 43*d* of the second principal face 43*a* of the second ridge-side cover 43 has two screw holes 43*c* disposed with an interval in the beam direction. Screws (not shown) are inserted in and fastened to the screw holes 43*c* and the roof substrate 3 so that the second ridge-side plate portion 43*d* of the second ridge-side cover 43 and the slates 7 are thereby fixed to the roof substrate 3 (jointed). On the other hand, the eaves-side end of the second principal face 43*a* of the second ridge-side cover 43 is inserted in the groove 15*n* of the ridge-side frame member 15 attached to a portion of each of the solar cell modules 5*a*, 5*c*, 5*d*, and 5*e* adjacent to the slates of the solar cell panel 11.

—Draining Structure—

A draining structure of the roof structure will now be described.

As illustrated in FIGS. 4A and 5, in two solar cell modules 5 (e.g., 5a and 5b, 5b and 5c, or 5d and 5e) adjacent to each other in the beam direction, a right end portion of the base plate 9 of the left solar cell module 5a, 5b, or 5d (hereinafter referred to as a left base plate 9) overlaps with the front side of the beam-side extension portion 9n of the base plate 9 of the right solar cell module 5b, 5c, or 5e (hereinafter referred to as a right base plate 9). In other words, the right bent portion 9b of the left base plate 9 overlaps with the front side of the left bent portion 9a of the right base plate 9. As described above, the left bent portion 9a and the ridge-side bent portion 9c of the base plate 9 is bent toward the front side to form a U shape in cross section, and serves as a back board. Thus, even when water enters from the boundary between the base plates 9 adjacent to each other in the beam direction, water does not enter the surface of the roof substrate 3.

From the viewpoint of setting an overlapping width W1 of the base plates 9 of the solar cell modules 5 (e.g., 5a and 5b, 5b and 5c, or 5d and 5e) adjacent to each other in the beam direction (see FIG. 5), that is, a width W1 of the beam-side extension portion 9n in the beam direction wider than the amount of entering of water due to capillary action, the width W1 is preferably 50 mm or more. Accordingly, even when water enters from the boundary between the base plates 9 adjacent to each other in the beam direction, this water does not reach the left end of the right base plate 9.

As illustrated in FIGS. 4B and 10, in two solar cell modules 5 adjacent to each other in the eaves-ridge direction, the eaves-side end of the base plate 9 of the ridge-side solar cell module 5f (hereinafter referred to as a ridge-side base plate 9) overlaps with the front sides of the ridge-side extension portions 9m of the base plates 9 of the eaves-side solar cell modules 5d and 5e (hereinafter referred to as eaves-side base plates 9). The eaves-side bent portion 9j of the ridge-side base plate 9 is constructed to overlap with the front side of the ridge-side bent portion 9c of the eaves-side base plate 9. As described above, the ridge-side bent portion 9c of the base plate 9 is bent toward the front side to form a U shape in cross section, and serves as a back board. Thus, even when water enters from the boundary between the base plates 9 adjacent to each other in the eaves-ridge direction, water does not enter the surface of the roof substrate 3.

From the viewpoint of setting an overlapping width W2 of the base plates 9 of the solar cell modules 5 adjacent to each other in the eaves-ridge direction (see FIG. 10), that is, a width W2 of the ridge-side extension portion 9m in the eaves-ridge direction, wider than the amount of entering of water due to capillary action, the width W2 is preferably 50 mm or more. Accordingly, even when water enters from the boundary between the base plates 9 adjacent to each other in the eaves-ridge direction, this water does not enter the right end of the eaves-side base plate 9.

As illustrated in FIG. 1B, a long draining plate 45 (corresponding to a draining member) is provided at the boundary between the base plate 9 of the solar cell module 5 and the slate 7 adjacent to the base plate 9 in the beam direction, and extends over the entire length of the boundary.

A left side portion of each draining plate 45 at the right of the base plate 9 of the building material-integrated solar cell module 5a, 5d, or 5f is located at the back side of the base plate 9 and at the front side of the waterproof sheet 3b. On the other hand, a right portion of each draining plate 45 at the right of the base plate 9 is located at the back side of the slate 7 and at the front side of the waterproof sheet 3b.

A right portion of each draining plate 45 at the left of the base plate 9 of the building material-integrated solar cell module 5c, 5e, or 5f is located at the front side of the base plate 9 and at the back side of the solar cell panel 11. On the other hand, a left portion of each draining plate 45 at the left of the base plate 9 is located at the front side of the base plate 9 and at the back side of the slate 7.

A region overlapping with the first ridge-side cover 41 or the second ridge-side cover 43 of the draining plate 45 is located at the back side of the first ridge-side cover 41 or the second ridge-side cover 43 and at the front side of the waterproof sheet 3b.

The roof surfaces 1 configured as described above can be built by constructing the building material-integrated solar cell modules 5a to 5f with the entire front face of the roof substrate 3 covered with the waterproof sheet 3b, then constructing the right draining plates 45 of the building material-integrated solar cell modules 5a, 5d, and 5f with left portions of the right draining plates 45 held between the base plate 9 of the building material-integrated solar cell modules 5a, 5d, and 5f and the waterproof sheet 3b, constructing the left draining plates 45 of the building material-integrated solar cell modules 5c, 5e, and 5f with right portions of the left draining plates 45 located at the front side of the base plates 9 of the building material-integrated solar cell modules 5c, 5e, and 5f, and lastly constructing the slates 7.

Each draining plate 45 includes a ridge-side expansion portion 45a extending to the ridge side from the ridge-side edge of the base plate 9. When being constructed as a roof structure, the ridge-side expansion portion 45a extends to the boundary between the second ridge-side cover 43 and the slates 7 arranged in the beam direction. Both ends, in the beam direction, of the draining plate 45 including the ridge-side expansion portion 45a are bent toward the front side to each form a U shape in cross section, and serves as a back board. Accordingly, water that has entered the boundary with the slates 7 adjacent to the base plates 9 in the beam direction and water that has entered the boundary between the slates 7 and the second ridge-side cover 43 are caused to flow in the eaves-ridge direction by the draining plate 45. The presence of the back boards can prevent water from entering the sheathing 3a from ends of the draining plate 45 in the beam direction.

—Grounding Structure—

A grounding structure of the roof structure will now be described.

Right ridge-side attachment holes 9e of the base plates 9 of the left solar cell modules 5a, 5b, and 5d overlap with the left ridge-side attachment holes 9e of the base plates 9 of the right solar cell modules 5b, 5c, and 5e. With washers (not shown) facing the front sides of the right ridge-side attachment holes 9e of the base plates 9 of the left solar cell modules 5a, 5b, and 5d, fixing screws (not shown) are sequentially inserted in and fastened to the right ridge-side attachment holes 9e of the base plates 9 of the left solar cell modules 5a, 5b, and 5d and the left ridge-side attachment holes 9e of the base plates 9 of the right solar cell modules 5b, 5c, and 5e from the front side. Accordingly, solar cell modules 5 arranged side by side in the beam direction are grounded. The surfaces of the washers (not shown) used here and facing the base plates 9 are jagged uneven surfaces. Thus, while the fixing screws (not shown) are being fastened, plating on the surfaces of the base plates 9 are removed by contact with the uneven surfaces of the washers (not shown), and the fixing screws are conducted to the base plates 9 through the washers. The base plates 9 of the solar cell modules 5 adjacent to one another are configured to be conducted to one another when the ridge-side frame members 15 of the solar cell modules 5 at the eaves side are engaged with the eaves-side frame members 21 of the solar cell modules 5 at the ridge side. Accordingly, the solar cell modules 5 adjacent to one another in the eaves-ridge direction are also grounded.

As described above, in this embodiment, the cables 35 drawn from the back side of the solar cell panels 11 are wired on the front sides of the base plates 9 formed of an incombustible material such as a metal. That is, since the base plates 9 are interposed between the roof substrate 3 and components such as the cables 35 and the connectors 37, high safety in, for example, fire protection performance can be obtained.

The cable hook 15$k$ for holding the cable 35 at a predetermined height is disposed at the ridge side of the ridge-side frame member 15, and the cable connector 37 is disposed near the cable hook 15$k$. Accordingly, a distance can be obtained between the cable connector 37 and the base plate 9, and thus, high safety in, for example, fire protection performance can be obtained.

In addition, since the lock seam structure is employed in the beam direction and the eaves-ridge direction of the base plates 9, the function as a draining structure can be obtained. For example, in arranging and constructing the solar cell modules 5, the solar cell modules 5 are stacked in such a manner that an end portion at a side bent toward the front side is located at the back side. Accordingly, water that has entered from boundaries between adjacent solar cell modules 5 does not enter the roof substrate 3.

The cushioning members 13 are arranged to be dispersed, and grooves extending over the entire length in the eaves-ridge direction are formed on each of the front side and the back side of the cushioning members 13. The front side of the cushioning member 13 also has the second front-side grooves 13$d$ extending in the non-formation regions where no first front-side grooves 13$c$ are formed. Accordingly, spaces are formed between the first and second front-side grooves 13$c$ and the solar cell panels 11 and between the first and second back-side grooves 13$a$ and 13$b$ and the base plates 9. In this manner, air permeability, drainability, and cable regions can be obtained.

Since the ridge sides of the base plates 9 are tilted to one side in the eaves-ridge direction with respect to the eaves sides thereof, even in a case where end portions of the base plates 9 overlap with one another in arranging and constructing the solar cell modules 5 in the beam direction, back board structures (bent portions of the U shapes) of adjacent ones of the base plates 9 are alternately arranged, and thus, do not overlap with each other.

Second Embodiment

Figure 14:
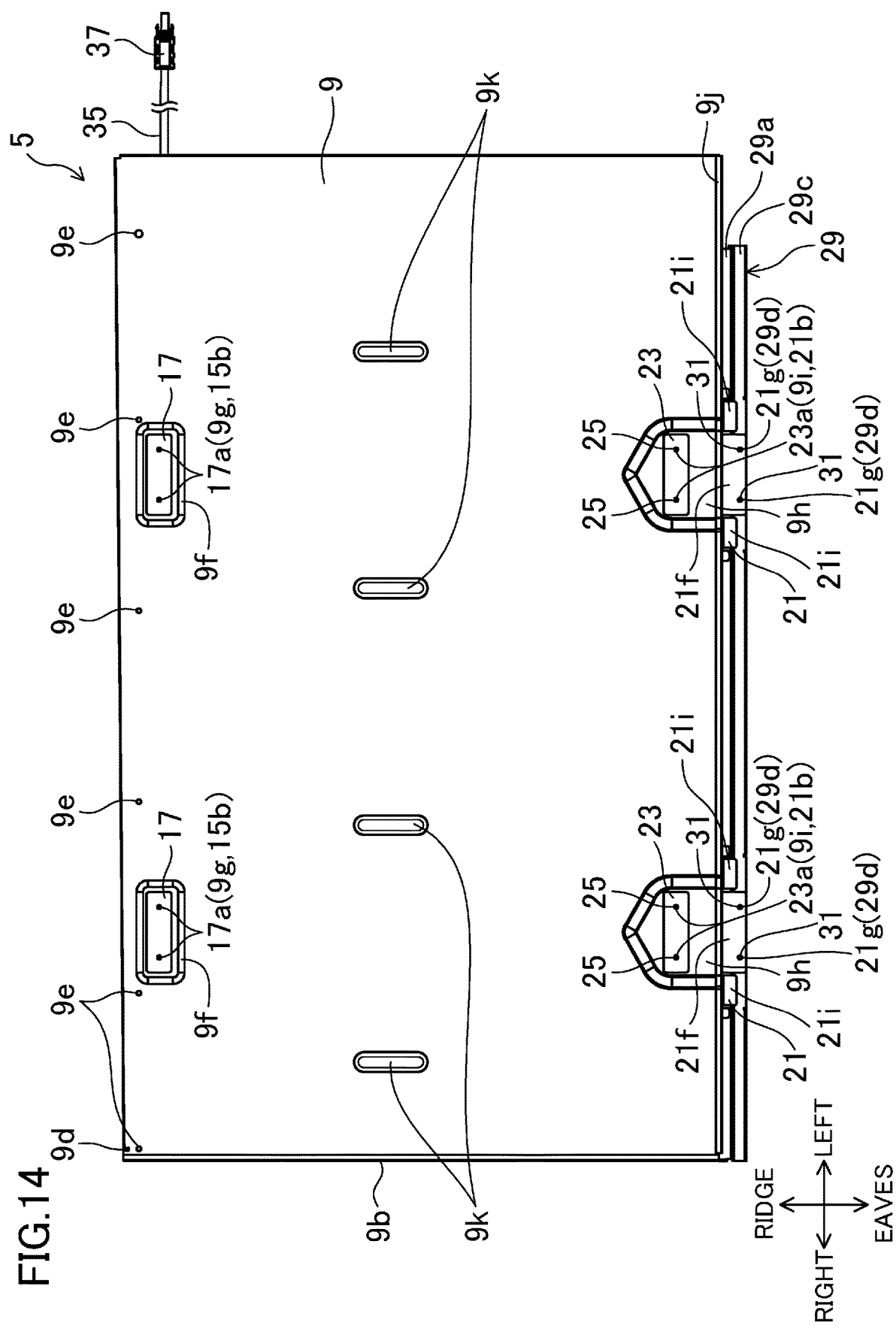
FIG. 14 A view for a second embodiment corresponding to FIG. 3.

FIG. 14 is a view for a second embodiment corresponding to FIG. 3. In the second embodiment, on an intermediate portion of each base plate 9 in the eaves-ridge direction, four reinforcing bulges 9$k$ elongated in the eaves-ridge direction and bulging to the back side are arranged with intervals in the beam direction.

Figure 15:
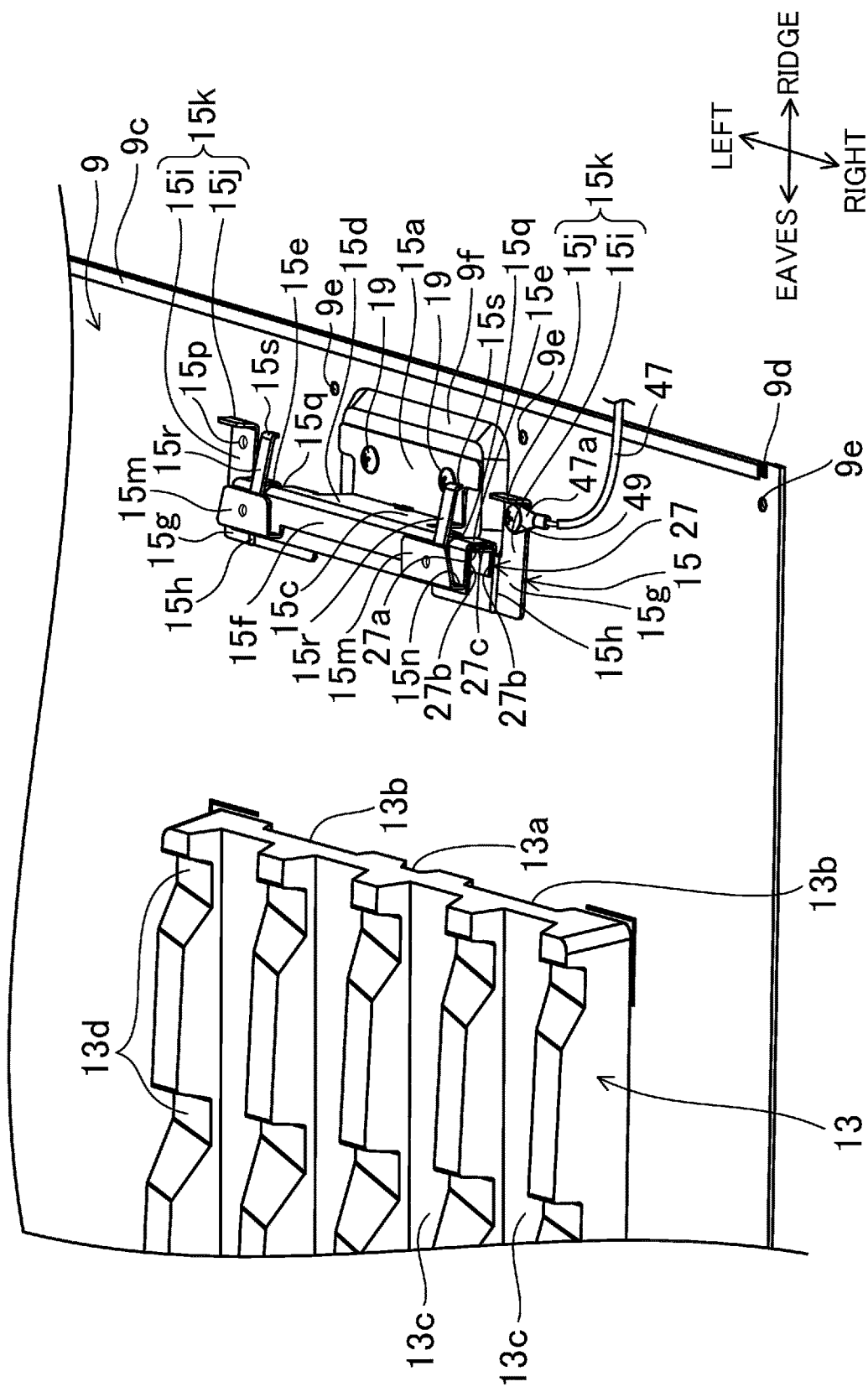
FIG. 15 A view for the second embodiment corresponding to FIG. 7.

As illustrated in FIG. 15, a ground hole 15$p$ as a circular connection portion is formed to penetrate a front end portion of each expansion wall 15$i$ of the ridge-side frame member 15. One bent wall 15$m$ of the ridge-side frame member 15 projects on each end portion, in the beam direction, of the front edge of the first holding wall 15$f$. In portions of the first holding wall 15$f$ of the ridge-side frame member 15, the expansion portion 15$e$ of the elevation portion 15$c$, and the second holding wall 15$g$ slightly away from both ends in the beam direction, notches 15$q$ are continuously formed over the entire length of the first holding wall 15$f$ in the projecting direction (eaves-ridge direction), the entire length of the expansion portions 15$e$ in the thickness direction of the base plate 9, and a base portion (ridge-side portion) of the second holding wall 15$g$. A slender protruding strip 15$r$ protruding in the ridge direction is formed on the edge of each notch 15$q$ toward the first holding wall 15$f$. A front bent portion 15$s$ bent toward the base plate 9 is formed at the front end of the protruding strip 15$r$. The protruding strip 15$r$ is formed by cutting out a portion corresponding to the notch 15$q$ and bending this portion.

Circular hole terminals 47$a$ attached to ends of ground wires 47 are fastened, with screws 49, to the ground holes 15$p$ of the ridge-side frame members 15 attached to two solar cell panels 11 adjacent to each other in the eaves-ridge direction so that peripheries of the ground holes 15$p$ of the ridge-side frame members 15 attached to the solar cell panels 11 are connected to each other through the ground wires 47 and the solar cell panels 11 adjacent to each other in the eaves-ridge direction are electrically connected to each other.

Figure 16:
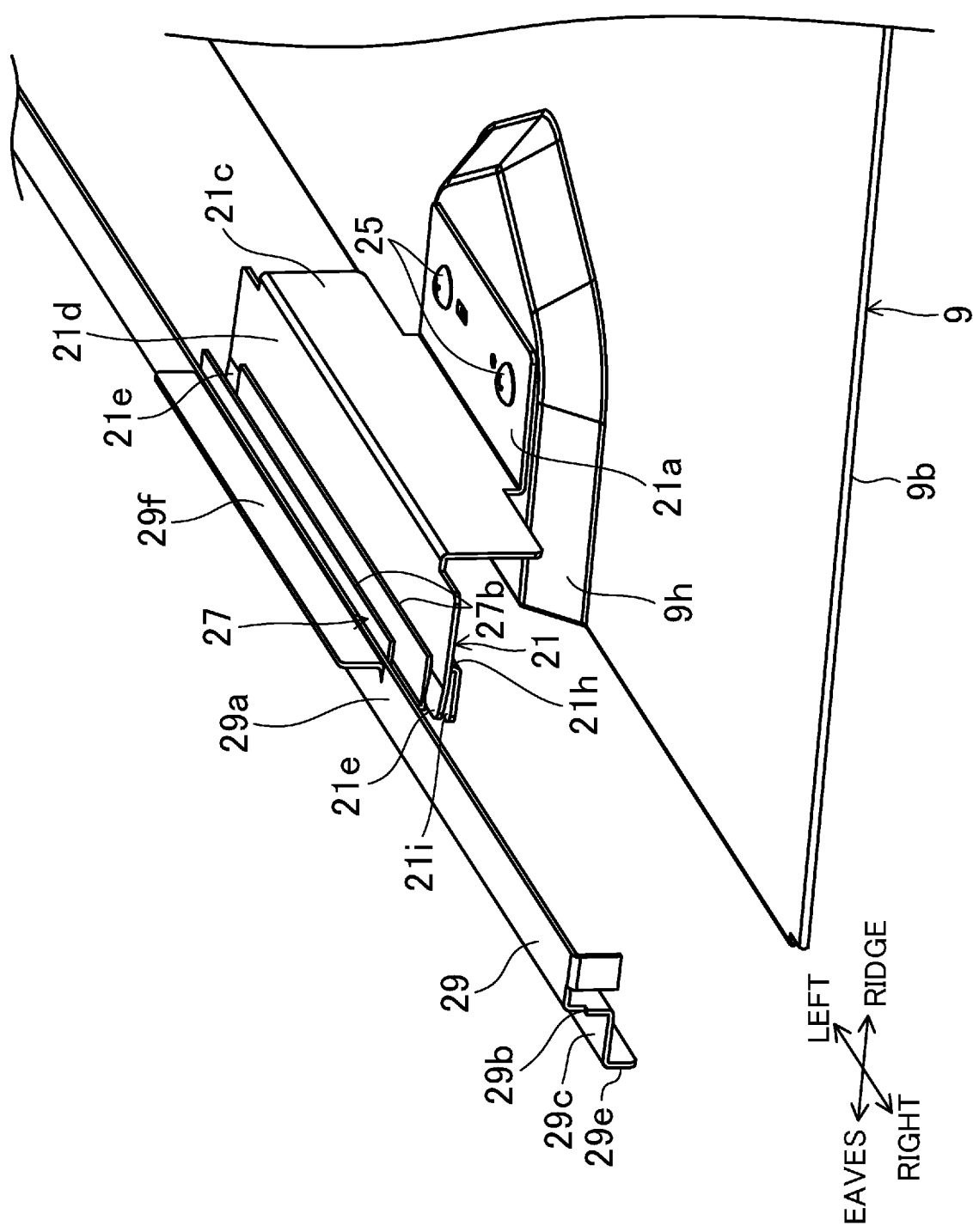
FIG. 16 A view for the second embodiment corresponding to FIG. 8.

As illustrated in FIG. 16, a rectangular plate-shaped snow guard portion 29$f$ extending in the beam direction with a plate face thereof oriented in the eaves-ridge direction integrally projects on a ridge-side end of a region of the first face 29$a$ of the cover member 29 where the gasket 27 is attached. In FIG. 16, the cover member 29 includes the snow guard portion 29$f$, but may not include the snow guard portion 29$f$. Only one or more of the plurality of cover members 29 may include the snow guard portion(s) 29$f$. The same holds for the other embodiments and variations.

Figure 17:
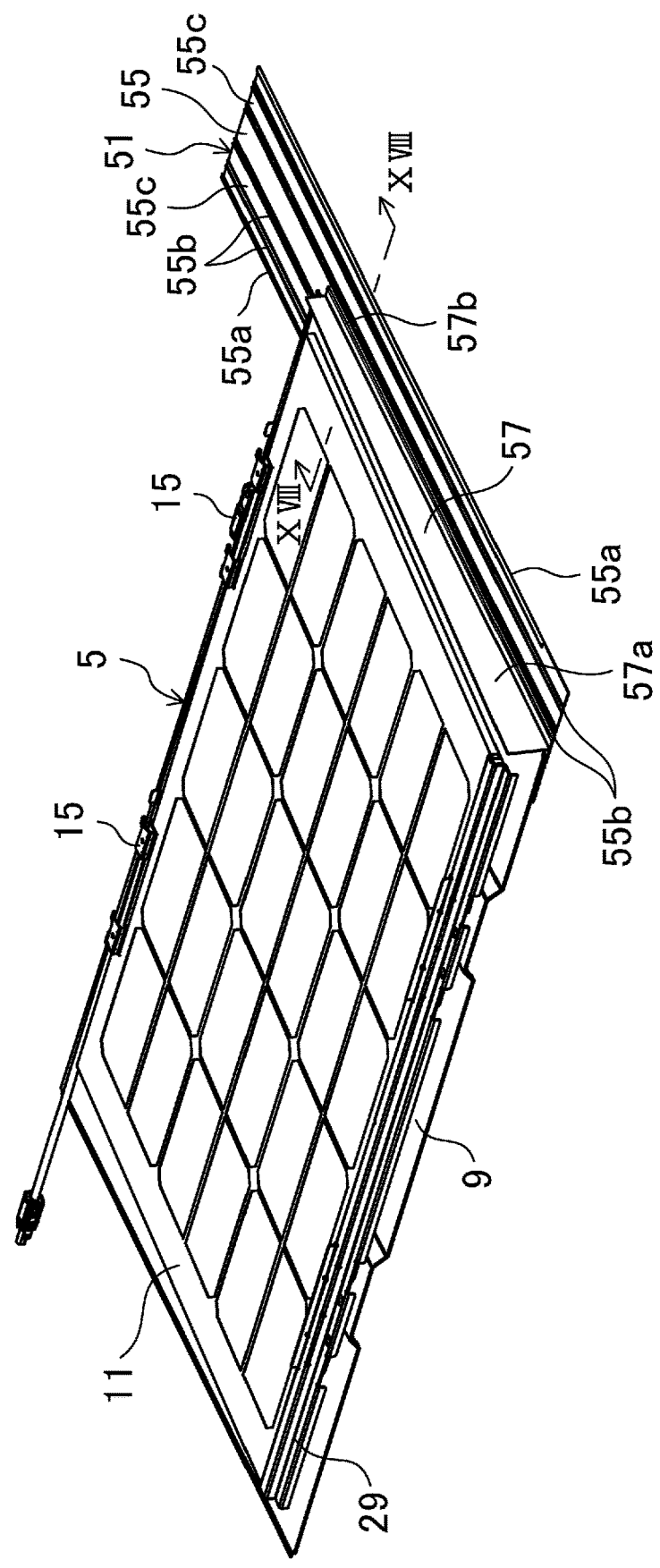
FIG. 17 A perspective view of building material-integrated solar cell modules and a first draining member.
Figure 18:
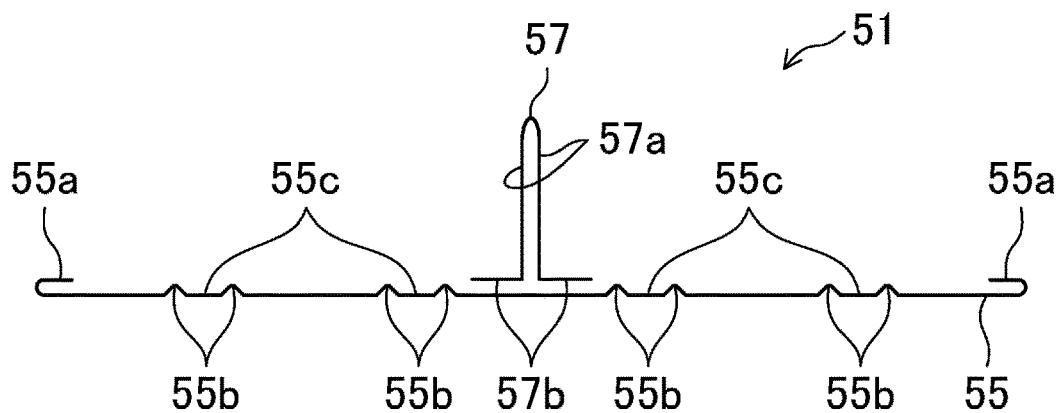
FIG. 18 A cross-sectional view taken along line XVIII-XVIII in FIG. 17.
Figure 19:
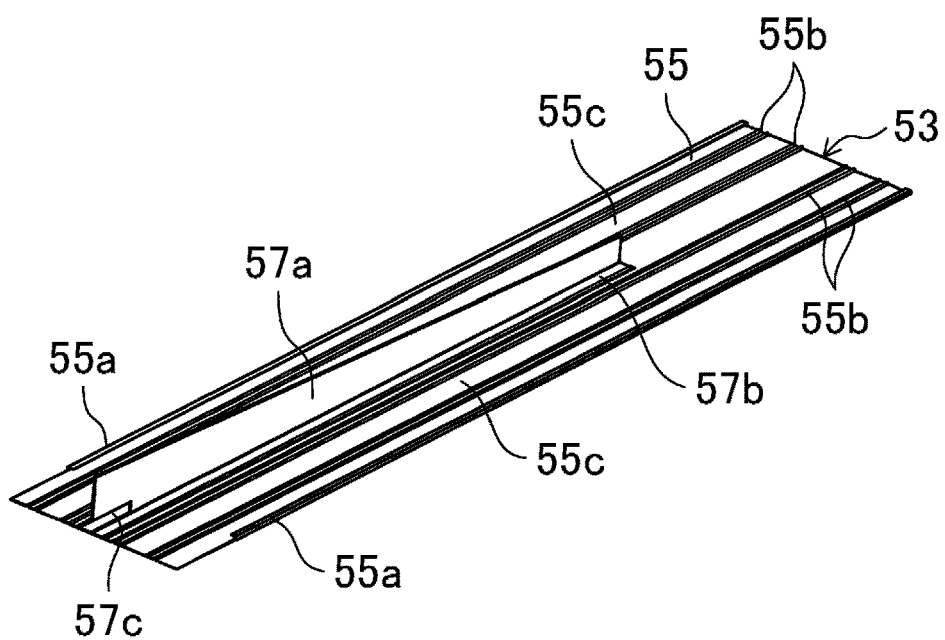
FIG. 19 A perspective view of a second draining member.

Instead of the draining plate 45, a long first draining member 51 illustrated in FIGS. 17 and 18 is provided at the boundary between the base plates 9 of the building material-integrated solar cell modules 5$a$ and 5$c$ at the eaves-side end and the slates 7 adjacent to the base plates 9 in the beam direction. Instead of the draining plate 45, a long second draining member 53 illustrated in FIG. 19 is provided at the boundary between the base plates 9 of the building material-integrated solar cell modules 5$d$ to 5$f$ not located at the eaves-side end and the slates 7 adjacent to the base plates 9 in the beam direction.

Each of the draining members 51 and 53 includes a body member 55 having a long plate shape (including an approximately long plate shape), and folded portions 55$a$ each having a U shape in cross section and bent inward in the lateral direction at one side over the longitudinal direction except for the other end in the longitudinal direction is formed at both lateral sides of the body member 55. The body member 55 includes four pairs of curved portions 55$b$ that project to the one side to form approximately V shapes in cross section, are arranged adjacent to one another with short intervals in the lateral direction, and are formed over the entire length in the longitudinal direction. Accordingly, two curved portions 55$b$ constituting each pair and the body member 55 between these curved portions 55$b$ constitute a groove 55$c$ extending in the longitudinal direction. The body member 55 is formed by bending one plate.

A projecting member 57 is fixed to a laterally center portion of the body member 55 at the one side over the entire length except for a lateral end thereof. The projecting member 57 is formed by bending one plate. The projecting member 57 includes a pair of opposed trapezoidal plate portions 57$a$ having the same trapezoidal shape whose width gradually increases from one end to the other end in the longitudinal direction in plan view. Ends of the trapezoidal plate portions 57a at one side in the lateral direction are coupled to each other, and jut-out plate portions 57b jutting out in directions away from each other are formed from ends of the trapezoidal plate portions 57a at the other side in the lateral direction. The jut-out plate portions 57b are fixed by swaging to a laterally center portion of the body member 55 at the one side over the entire length of the body member 55 except for one end thereof in the longitudinal direction, with narrower sides of the trapezoidal plate portions 57a facing toward one end in the longitudinal direction of the body member 55.

Notch recesses 57c are formed in base portions of the second draining member 53 at the wider sides of the trapezoidal plate portions 57a, and are recessed toward the narrower sides, whereas no notch recesses 57c are formed in the first draining member 51.

Portions of the body members 55 of the draining members 51 and 53 configured as described above except for portions at one end in the longitudinal direction (regions where no projecting members 57 are provided) extend across the boundaries between the base plates 9 of the building material-integrated solar cell modules 5a and 5c to 5f and the slates 7 adjacent to these base plates 9, with the plate faces thereof oriented along the front faces of the base plates 9 (front face of the roof substrate 3). The trapezoidal plate portions 57a of the draining members 51 and 53 project toward the front side at positions corresponding to the boundary between the base plates 9 and the slates 7. The front ends of the trapezoidal plate portions 57a tilt with respect to the surfaces of the base plate and are located close to the solar cell panel 1 so as to extend along the front face of the solar cell panels 11. The front ends of the trapezoidal plate portions 57a are formed not to project from the front faces of the solar cell panels 11.

In a manner similar to the first embodiment, in the second embodiment, left portions of the draining members 51 and 53 at the right of the base plates 9 of the building material-integrated solar cell modules 5a, 5d, and 5f are located at the back side of the base plates 9 and at the front side of the waterproof sheets 3b. On the other hand, right portions of the draining members 51 and 53 at the right of the base plates 9 are located at the back side of the slates 7 and at the front side of the waterproof sheet 3b.

Right portions of the draining members 51 and 53 at the left of the base plates 9 of the building material-integrated solar cell modules 5c, 5e, and 5f are located at the front side of the base plates 9 and at the back side of the solar cell panels 11. On the other hand, left portions of the draining members 51 and 53 at the left of the base plates 9 are located at the front side of the base plates 9 and at the back side of the slates 7.

End portions of the body members 55 of the draining members 51 and 53 at one side in the longitudinal direction (regions where no projecting members 57 are provided) project toward the ridge side from the boundaries between the base plates 9 and the slates 7. Regions of the end portions of the body members 55 of the draining members 51 and 53 at the one end in the longitudinal direction overlapping with the first ridge-side cover 41 or the second ridge-side cover 43 are located at the back side of the first ridge-side cover 41 or the second ridge-side cover 43 and at the front side of the waterproof sheet 3b.

A ridge-side end of the solar cell panel 11 adjacent to the eaves side of the second draining member 53 is fitted in the notch recess 57c of each second draining member 53.

The other part of the configuration is the same as that in the first embodiment, and thus, the same components are denoted by the same reference characters, and description thereof will not be repeated.

Thus, in the second embodiment, since the base plates 9 include the reinforcing bulges 9k, deformation of the base plates 9 can be prevented or reduced.

In addition, since the ridge-side frame members 15 has the ground holes 15p, the number of parts can be reduced, as compared to a case where members for providing the ground holes 15p are provided separately from the ridge-side frame members 15.

The snow guard portions 29f are integrally formed on the cover members 29, and thus, the number of parts can be reduced, as compared to a case where members for forming snow guards provided separately from the snow guard portions 29f. This also eliminates necessity for attaching members for snow guards to the cover members 29 or the solar cell panels 11 so that construction can be thereby easily performed.

The draining members 51 and 53 have the trapezoidal plate portions 57a, and thus, entering of water, insects, and small animals to the back side of the solar cell panels 11 from the outside in the beam direction can be reduced.

The front ends of the trapezoidal plate portions 57a of the draining members 51 and 53 are formed not to project from the front faces of the solar cell panels 11, and thus, the trapezoidal plate portions 57a do not block sunlight.

Since the front ends of the trapezoidal plate portions 57a of the draining members 51 and 53 are close to the edges of the solar cell panels 11, entering of water, insects, and small animals from a space between the solar cell panels 11 and the trapezoidal plate portions 57a can be reduced.

In constructing the slates 7, the edges of the slates 7 in the beam direction are brought into contact with the trapezoidal plate portions 57a of the draining members 51 and 53 so that the slates 7 can be thereby positioned in the beam direction.

Since the draining members 51 and 53 are constituted by the body members 55 and the projecting members 57, plates to be subjected to a bending process are allowed to have small size and are easy to carry, and thus, the bending process can be easily performed, as compared to a case where the entire draining members 51 and 53 are constituted by one member. In addition, availability of a material in punching of components of the draining members 51 and 53 can be enhanced.

The side walls of the grooves 55c of the draining members 51 and 53, that is, the curved portions 55b, reduce spreading of water attached to the inner sides of the grooves 55c outward of the groove 55c, and thus, drainability can be enhanced.

In addition, the folded portions 55a of the draining members 51 and 53 reduce spreading of water attached to the laterally inner side than the folded portions 55a of the draining members 51 and 53 outward in the lateral direction, and thus, entering of water into the back side of the draining members 51 and 53 can be reduced.

First Variation of Second Embodiment

Figure 20:
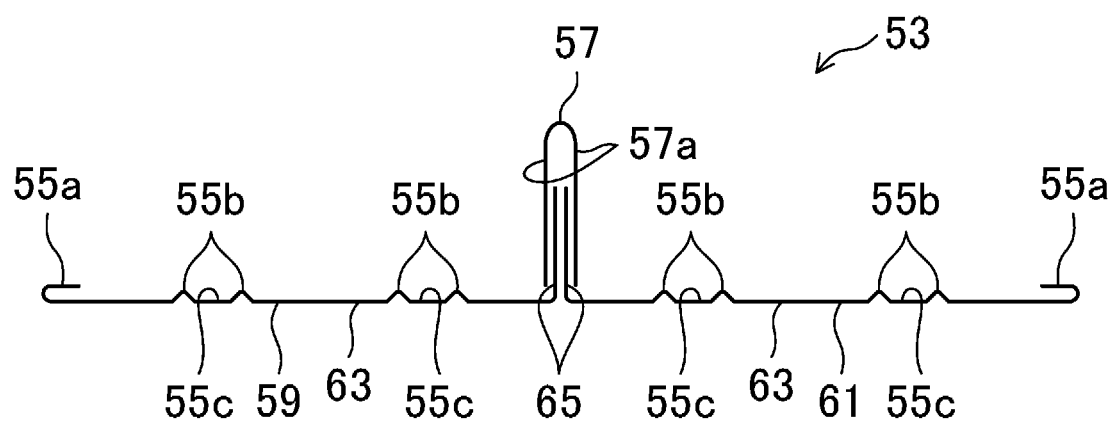
FIG. 20 A view for a first variation of the second embodiment corresponding to FIG. 18.

FIG. 20 is a view for a first variation of the second embodiment corresponding to FIG. 18. In the first variation, instead of the body members 55, each of the draining members 51 and 53 includes a left draining component 59 and a right draining component 61 adjacent to the right of the left draining component 59. Each of the left draining component 59 and the right draining component 61 includes an approximately long plate-shaped main plate portion 63. Two pairs of the curved portions 55b are arranged with intervals in the lateral direction on an intermediate portion of each main plate portion 63. The folded portions 55a are formed at the left end of the main plate portion 63 of the left draining component 59 and at the right end of the main plate portion 63 of the right draining component 61. Protruding walls 65 protrude on the right edge of the left draining component 59 and the left edge of the right draining component 61 over the entire length in the longitudinal direction except for the ridge-side ends. The projecting member 57 includes no jut-out plate portions 57b, the left trapezoidal plate portions 57a are fixed to the protruding wall 65 of the left draining component 59 by swaging, and the right trapezoidal plate portion 57a is fixed to the protruding wall 65 of the right draining component 61 by swaging.

The other part of the configuration is the same as that in the second embodiment, and thus, the same components are denoted by the same reference characters, and description thereof will not be repeated.

Second Variation of Second Embodiment

Figure 21:
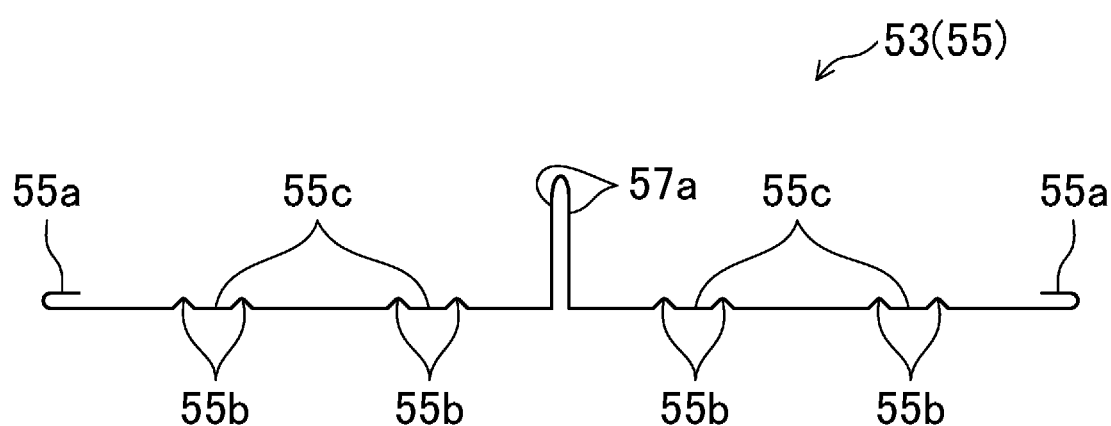
FIG. 21 A view for a second variation of the second embodiment corresponding to FIG. 18.

FIG. 21 is a view for a second variation of the second embodiment corresponding to FIG. 18. In the second variation, each of the draining members 51 and 53 is constituted only by the body member 55. The trapezoidal plate portions 57a are formed by bending a laterally center portion of the body member 55.

The other part of the configuration is the same as that in the second embodiment, and thus, the same components are denoted by the same reference characters, and description thereof will not be repeated.

Third Embodiment

Figure 22:
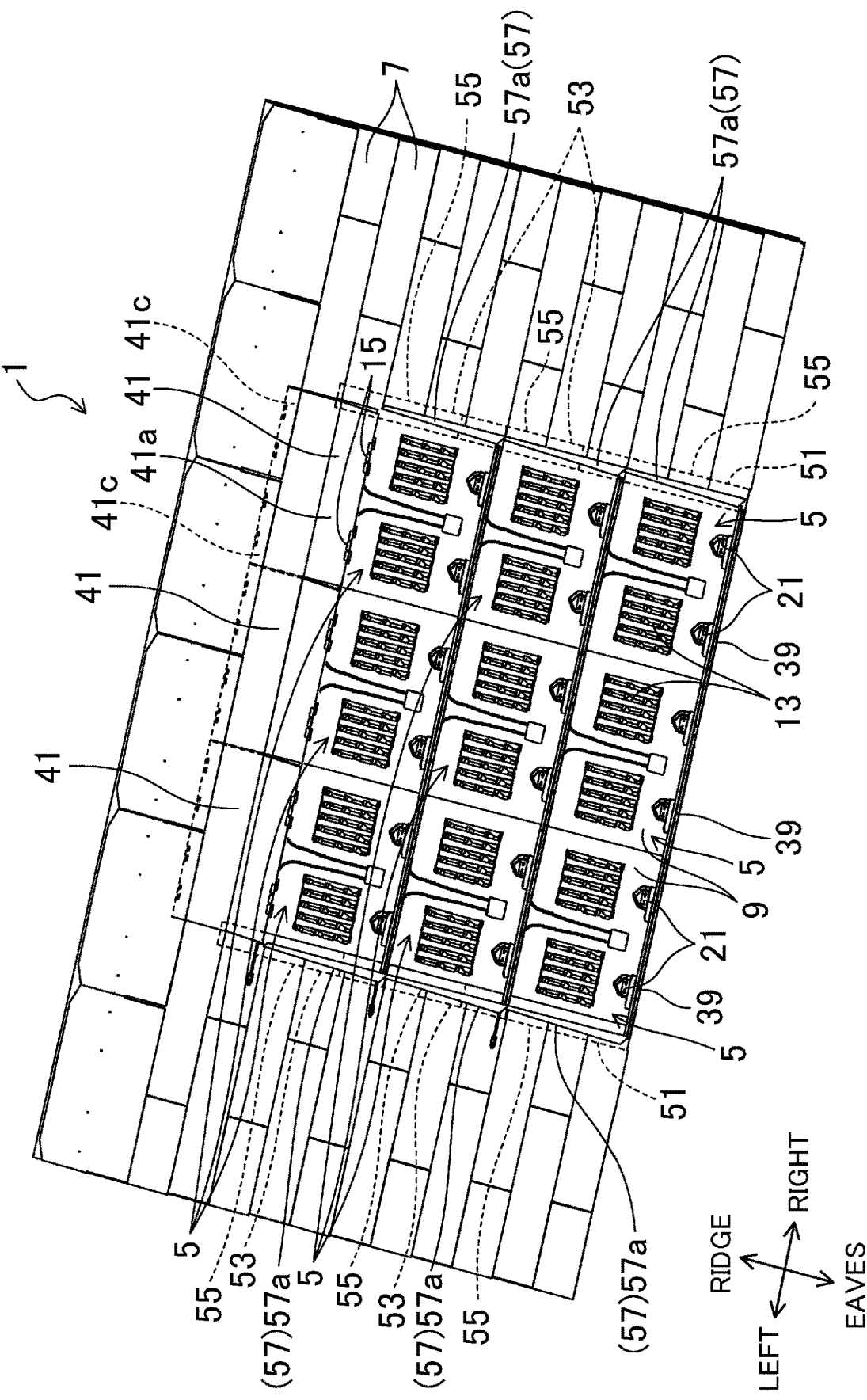
FIG. 22 A view for a third embodiment corresponding to FIG. 1B.

FIG. 22 is a view for a third embodiment corresponding to FIG. 1B. In the third embodiment, building material-integrated solar cell modules 5 are arranged in three rows and three columns on a roof surface 1. In draining members 51 and 53 adjacent to each other in the eaves-ridge direction, an eaves-side end (a region where no folded portions 55a are formed) of the ridge-side draining member 53 overlaps with ridge-side ends (regions where no projecting member 57 are provided) of the body members 55 of the eaves-side draining members 51 and 53 from the front side. Movement of lateral ends of an eaves-side end portion of the ridge-side draining member 53 toward the front side is restricted by folded portions 55a at ridge-side ends of the body members 55 of the eaves-side draining members 51 and 53.

The other part of the configuration is the same as that in the second embodiment, and thus, the same components are denoted by the same reference characters, and description thereof will not be repeated.

Thus, in the third embodiment, in the draining members 51 and 53 adjacent to each other in the eaves-ridge direction, no folded portions 55a are formed at the eaves-side end of the ridge-side draining member 53, and thus, the eaves-side end of the ridge-side draining member 53 can be easily overlapped with the ridge-side end portions of the eaves-side draining members 51 and 53 from the front side, as compared to the case of forming folded portions 55a.

First Variation of Third Embodiment

Figure 23:
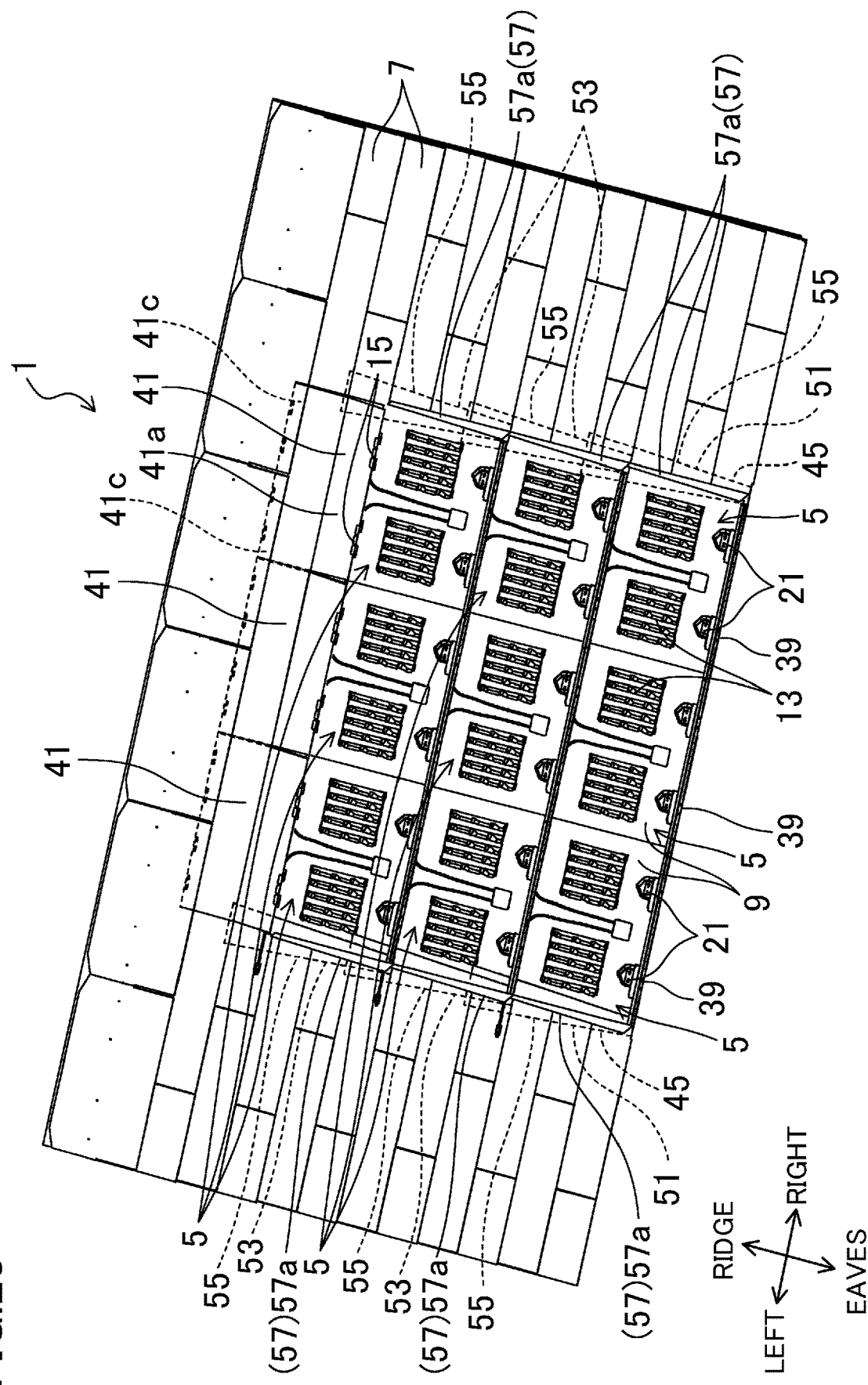
FIG. 23 A view for a first variation of the third embodiment corresponding to FIG. 22.

FIG. 23 is a view for a first variation of the third embodiment corresponding to FIG. 22. In the first variation, the body member 55 has an isoscales trapezoidal plate shape whose width gradually increases toward the ridge side. Folded portions 55a are formed on lateral ends of the body member 55 over the entire length in the longitudinal direction.

The other part of the configuration is the same as that in the third embodiment, and thus, the same components are denoted by the same reference characters, and description thereof will not be repeated.

As described above, in the first variation, in the draining members 51 and 53 adjacent to each other in the eaves-ridge direction, an eaves-side end portion of the ridge-side draining member 53 is narrower than ridge-side end portions of the body members 55 of the eaves-side draining members 51 and 53. Thus, the eaves-side end portion of the ridge-side draining member 53 can be easily overlapped with the ridge-side portions of the eaves-side draining members 51 and 53.

Second Variation of Third Embodiment

Figure 24:
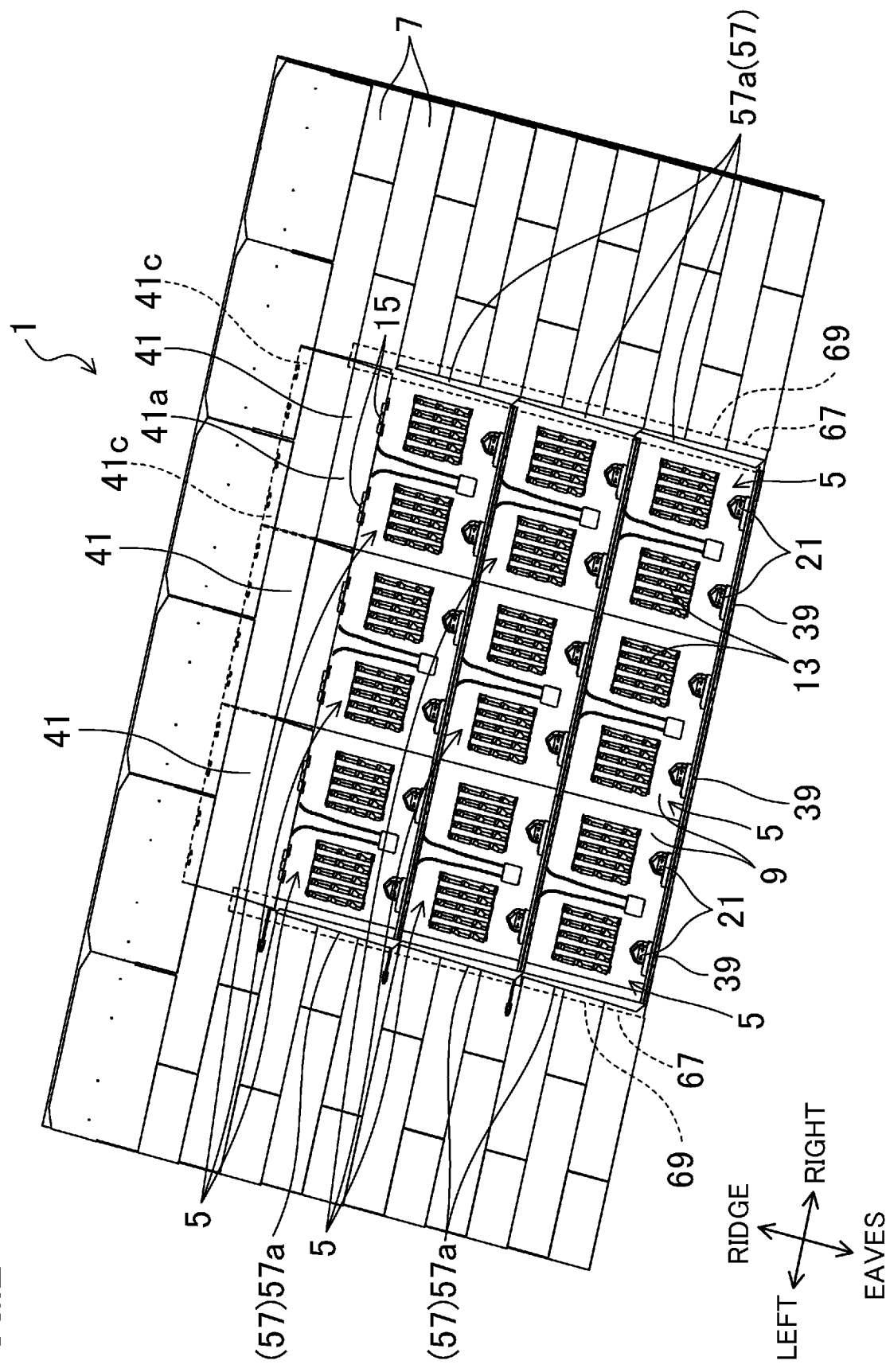
FIG. 24 A view for a second variation of the third embodiment corresponding to FIG. 22.
Figure 25:
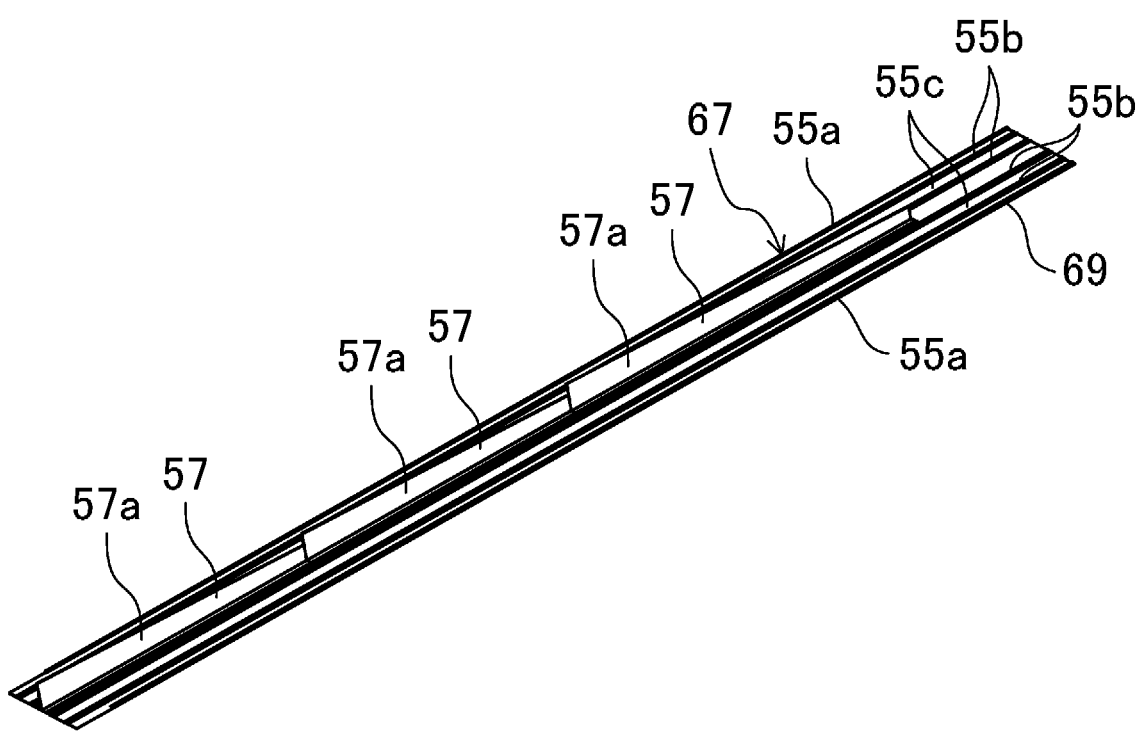
FIG. 25 A perspective view of a draining member for three steps.

FIG. 24 is a view for a second variation of the third embodiment corresponding to FIG. 22. In the second variation, instead of the three draining members 51 and 53 arranged in the eaves-ridge direction, a long draining member 67 for three steps (three-step draining member) illustrated in FIG. 25 is disposed with the longitudinal direction thereof oriented in the eaves-ridge direction. The three-step draining member 67 includes an approximately long plate-shaped body member 69 whose plate face extending along the front face of the base plate 9 (front face of the roof substrate 3). On a laterally center portion of the body member 69 except for the ridge-side end thereof, three projecting members 57 are fixed with trapezoidal plate portions 57a thereof projecting toward the front side, and are arranged to be adjacent to one another in the eaves-ridge direction with the narrow sides of the trapezoidal plate portions 57a oriented toward the ridge side. On the body member 69, the folded portions 55a and the curved portions 55b are formed over the entire length in the longitudinal direction.

The other part of the configuration is the same as that in the third embodiment, and thus, the same components are denoted by the same reference characters, and description thereof will not be repeated.

Thus, in the second variation, the process of overlapping the three draining members 51 and 53 with one another is unnecessary, and thus, building can be easily conducted.

Other Embodiments

In the example of the foregoing description, the roof structure is the hip roof, but the technique of the present disclosure is also applicable to a gable roof. In such a case, similar advantages can be obtained. Similarly, in the case of the gable roof, solar cell panels are constructed with positions thereof in the beam direction being aligned, and the same solar cell modules 5 as those used in the embodiments described above may be used. It is preferable to use one of a hip roof or a gable roof that can be built at maximum may be employed.

DESCRIPTION OF REFERENCE CHARACTERS 3 roof substrate
5 solar cell module (building material-integrated solar cell module)

9 base plate
9*m* ridge-side extension portion
9*n* beam-side extension portion
11 solar cell panel
13 cushioning member
13*a* first back-side groove (first groove)
13*b* second back-side groove (first groove)
13*c* first front-side groove (third groove)
13*d* second front-side groove (second groove)
15 ridge-side frame member (ridge-side support member)
15*k* cable hook (holder)
21 eaves-side frame member (eaves-side support member)
35 cable
41 first ridge-side cover (ridge cover)
45 draining plate (draining member)
45*a* ridge-side expansion portion
51, 53 draining member
55 body member
57 projecting member

The invention claimed is:

1. A building material-integrated solar cell module configured to be attached onto a roof substrate, the building material-integrated solar cell module comprising:
a solar cell panel included in the building material-integrated solar cell module;
a cushioning member disposed at a back side of the solar cell panel;
a base plate formed of an incombustible material, a front side of the base plate contacting and supporting the cushioning member; and
a cable drawn from the back side of the solar cell panel and wired on the front side of the base plate,
wherein
the cushioning member is divided into a plurality of parts that are dispersed on the base plate,
a first groove extending in an eaves-ridge direction is formed on a back side of the cushioning member,
a second groove extending in a beam direction and a third groove extending in the eaves-ridge direction are formed on a surface of the cushioning member, and
the third groove is deeper than the second groove in a front-back direction.

2. The building material-integrated solar cell module according to claim 1, wherein
a ridge-side support member supporting a ridge-side end of the solar cell panel and an eaves-side support member supporting an eaves-side end of the solar cell panel are disposed at the front side of the base plate,
a holder holding the cable at a predetermined height is disposed at a ridge side of the ridge-side support member, and
the cable is held by the holder such that a connector connected to a front end of the cable is disposed near the holder.

3. The building material-integrated solar cell module according to claim 1, wherein the base plate includes
a ridge-side extension portion extending to a ridge side relative to a ridge-side support member supporting the ridge-side end of the solar cell panel, and
a beam-side extension portion extending outward relative to at least one end of the solar cell panel in a beam direction in a front view seen from a front side, and
one end of the base plate in one or both of a beam direction and an eaves-ridge direction is bent toward the front side, whereas another end of the base plate is bent toward a back side.

4. The building material-integrated solar cell module according to claim 1, wherein
the second groove of the cushioning member has a side wall in an eaves direction, and the side wall tilts to the eaves direction with respect to a horizontal direction between adjacent third grooves.

5. The building material-integrated solar cell module according to claim 1, wherein
a ridge side of the base plate tilts to one side in an eaves-ridge direction with respect to an eaves side of the base plate.

6. A roof structure in which a plurality of building material-integrated solar cell modules according to claim 1 are arranged such that back sides of the base plates are in contact with a front side of a roof substrate, wherein
in the plurality of building material-integrated solar cell modules, end portions, in an eaves-ridge direction and/or in a beam direction, of the base plates of adjacent ones of the building material-integrated solar cell modules overlap with each other.

7. The roof structure according to claim 6, wherein
a width in which the end portions of the base plates of the adjacent building material-integrated solar cell modules overlap with each other is 50 mm or more.

8. A roof structure in which a plurality of building material-integrated solar cell modules are arranged, each of the plurality of building material-integrated solar cell modules is configured to be attached onto a roof substrate, and each of the building material-integrated solar cell modules comprises:
a solar cell panel included in the building material-integrated solar cell module;
a cushioning member disposed at a back side of the solar cell panel;
a base plate formed of an incombustible material, a front side of the base plate contacting and supporting the cushioning member; and
a cable drawn from the back side of the solar cell panel and wired on the front side of the base plate,
wherein
the plurality of building material-integrated solar cell modules are arranged such that back sides of the base plates are in contact with a front side of a roof substrate, and
in the plurality of building material-integrated solar cell modules, end portions, in an eaves-ridge direction and/or in a beam direction, of the base plates of adjacent ones of the building material-integrated solar cell modules overlap with each other, and
the roof structure comprises:
beam-side room members adjacent to the building material-integrated solar cell modules in a beam direction, wherein
a draining member is disposed at a boundary between each of the building material-integrated solar cell modules and an adjacent one of the beam-side room members, the draining member extends in the beam direction from a space between the beam-side room member and the roof substrate to a space under the solar cell panel of the building material-integrated solar cell module and extends along an eaves-ridge direction, and
the draining member includes a ridge-side expansion portion extending in a ridge direction relative to a ridge-side end of the base plate of the building material-integrated solar cell module.

9. The roof structure according to claim 8, wherein
the draining member includes a long plate-shaped body member, and a projecting member extending over an entire length in a longitudinal direction except for one end of the body member is fixed to a laterally center portion of a front side of the body member.

10. The roof structure according to claim 9, wherein
the projecting member of the draining member tilts with respect to a front face of the base plate such that the projecting member extends along a front face of the solar cell panel and does not project from the front face of the solar cell panel toward a front side.

11. The roof structure according to claim 10, wherein
the projecting member of the draining member is located close to an edge of the solar cell panel.

12. The roof structure according to claim 8, wherein
the draining member has an isoscales trapezoidal plate shape whose width gradually increases toward a ridge.

13. The roof structure according to claim 8, wherein
the draining member includes a long plate-shaped body member, and end portions of the body member in a beam direction have folded portions, the folded portions are folded inward in a lateral direction on a front side of the plate-shaped body member over an enter length in a longitudinal direction except for one end of the plate-shaped body member in an eaves-ridge direction.

14. The roof structure according to claim 6, comprising
a ridge cover is disposed on a ridge side of a first building material-integrated solar cell module that is one of the plurality of building material-integrated solar cell modules located at a ridge-side end, and
an eaves-side end of the ridge cover is fixed to a ridge-side support member of the solar cell panel constituting the first building material-integrated solar cell module.

15. The building material-integrated solar cell module according to claim 1, wherein
the front side of the base plate is the eave side when the base plate is installed on a roof.

* * * * *